(12) United States Patent
Tang et al.

(10) Patent No.: US 11,292,602 B2
(45) Date of Patent: Apr. 5, 2022

(54) CIRCUIT, BASE STATION, METHOD, AND RECORDING MEDIUM

(71) Applicant: SONY CORPORATION, Tokyo (JP)

(72) Inventors: Yifu Tang, Kanagawa (JP); Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 293 days.

(21) Appl. No.: 16/337,233

(22) PCT Filed: Oct. 5, 2017

(86) PCT No.: PCT/JP2017/036379
§ 371 (c)(1),
(2) Date: Mar. 27, 2019

(87) PCT Pub. No.: WO2018/083942
PCT Pub. Date: May 11, 2018

(65) Prior Publication Data
US 2019/0300185 A1     Oct. 3, 2019

(30) Foreign Application Priority Data

Nov. 4, 2016  (JP) .............................. JP2016-216051

(51) Int. Cl.
*B64D 25/00*        (2006.01)
*B64C 39/02*        (2006.01)
(Continued)

(52) U.S. Cl.
CPC .............. *B64D 25/00* (2013.01); *B64C 13/20* (2013.01); *B64C 39/02* (2013.01); *B64C 39/024* (2013.01);
(Continued)

(58) Field of Classification Search
CPC ......... B60W 60/0015; B60W 30/0953; B60W 30/0956; B60W 50/0205; B60W 50/023; B60W 50/04; G01C 21/3407; G05B 9/02
See application file for complete search history.

(56) References Cited

U.S. PATENT DOCUMENTS 5,321,489 A *  6/1994  Defour .................... G01S 7/481
                                                       342/29
9,508,263 B1*  11/2016  Teng ...................... G08G 5/006
(Continued)

FOREIGN PATENT DOCUMENTS

CN        102859569 A      1/2013
CN        104166355 A     11/2014
(Continued)

OTHER PUBLICATIONS

Office Action for EP Patent Application No. 17866500.6, dated Jul. 17, 2020, 08 pages of Office Action.
(Continued)

*Primary Examiner* — Hussein Elchanti
(74) *Attorney, Agent, or Firm* — Chip Law Group

(57) ABSTRACT

Provided is a circuit including a report unit that reports action-allowable time information regarding an action-allowable time to a base station, and an action control unit that controls an action of a moving object on the basis of an action instruction. The action instruction is decided on the basis of the reported action-allowable time information and notified of by the base station. The action control unit further controls the action with reference to a map in which a danger level for each place is defined in an emergency situation.

20 Claims, 21 Drawing Sheets

(51) Int. Cl.
*G05D 1/00* (2006.01)
*B64C 13/20* (2006.01)
*G08G 5/00* (2006.01)
*G05D 1/06* (2006.01)
*B64D 27/24* (2006.01)

(52) U.S. Cl.
CPC ............ *B64D 27/24* (2013.01); *G05D 1/0011* (2013.01); *G05D 1/0022* (2013.01); *G05D 1/0688* (2019.05); *G08G 5/00* (2013.01)

(56) References Cited

U.S. PATENT DOCUMENTS

| | | | |
|---|---|---|---|
| 10,103,812 B2* | 10/2018 | Busche | H04B 7/18502 |
| 2002/0033769 A1* | 3/2002 | Bass | G01S 5/12 |
| | | | 342/418 |
| 2005/0230563 A1* | 10/2005 | Corcoran, III | B64C 13/18 |
| | | | 244/175 |
| 2009/0027253 A1* | 1/2009 | van Tooren | G08G 5/045 |
| | | | 342/29 |
| 2009/0257314 A1* | 10/2009 | Davis | G01S 5/18 |
| | | | 367/125 |
| 2010/0042269 A1* | 2/2010 | Kokkeby | G01S 3/7864 |
| | | | 701/3 |
| 2010/0084513 A1 | 4/2010 | Gariepy et al. | |
| 2010/0100269 A1* | 4/2010 | Ekhaguere | G08G 5/0078 |
| | | | 701/26 |
| 2010/0238956 A1* | 9/2010 | Preuss | G01S 5/0226 |
| | | | 370/503 |
| 2011/0264312 A1 | 10/2011 | Spinelli et al. | |
| 2011/0299732 A1* | 12/2011 | Jonchery | G06K 9/2018 |
| | | | 382/103 |
| 2012/0290164 A1* | 11/2012 | Hanson | B60F 5/00 |
| | | | 701/23 |
| 2013/0179067 A1* | 7/2013 | Trowbridge | G01C 21/34 |
| | | | 701/410 |
| 2013/0282208 A1 | 10/2013 | Mendez-Rodriguez et al. | |
| 2014/0018979 A1* | 1/2014 | Goossen | G05D 1/0044 |
| | | | 701/3 |
| 2014/0249741 A1 | 9/2014 | Levien et al. | |
| 2014/0288813 A1* | 9/2014 | Levien | F41G 7/2206 |
| | | | 701/301 |
| 2015/0302858 A1* | 10/2015 | Hearing | G01H 1/00 |
| | | | 381/58 |
| 2016/0111006 A1* | 4/2016 | Srivastava | G08G 5/0026 |
| | | | 701/3 |
| 2016/0140851 A1 | 5/2016 | Levy et al. | |
| 2016/0189549 A1* | 6/2016 | Marcus | G08G 5/0091 |
| | | | 701/3 |
| 2016/0297521 A1 | 10/2016 | Cheatham et al. | |
| 2016/0347462 A1* | 12/2016 | Clark | B64D 17/80 |
| 2017/0148467 A1* | 5/2017 | Franklin | G10L 25/39 |
| 2017/0150050 A1 | 5/2017 | Umeo | |
| 2017/0154535 A1* | 6/2017 | Downey | B64C 39/024 |
| 2017/0162064 A1* | 6/2017 | Ubhi | G08G 5/0013 |
| 2017/0178518 A1* | 6/2017 | Foladare | G08G 5/0034 |
| 2017/0192418 A1* | 7/2017 | Bethke | B64D 47/00 |
| 2017/0243494 A1* | 8/2017 | Taveira | G08G 5/0069 |
| 2017/0267343 A1* | 9/2017 | Chen | G06Q 10/08355 |
| 2017/0313433 A1 | 11/2017 | Ozaki | |
| 2017/0334559 A1* | 11/2017 | Bouffard | G08G 5/0082 |
| 2018/0003656 A1* | 1/2018 | Michini | H02S 50/10 |
| 2018/0025649 A1* | 1/2018 | Contreras | G05D 1/0033 |
| | | | 701/3 |
| 2018/0068567 A1* | 3/2018 | Gong | B64C 39/024 |
| 2018/0090016 A1* | 3/2018 | Nishi | G05D 1/102 |
| 2018/0277000 A1* | 9/2018 | Uesugi | H04B 7/18504 |

FOREIGN PATENT DOCUMENTS

| | | |
|---|---|---|
| CN | 105652884 A | 6/2016 |
| CN | 107074367 A | 8/2017 |
| EP | 2177966 A2 | 4/2010 |
| EP | 2561501 A2 | 2/2013 |
| EP | 2850455 A1 | 3/2015 |
| JP | 2010-095246 A | 4/2010 |
| JP | 2011-240745 A | 12/2011 |
| JP | 2013-528854 A | 7/2013 |
| JP | 2014-162316 A | 9/2014 |
| JP | 2014-181034 A | 9/2014 |
| JP | 2015-522458 A | 8/2015 |
| JP | 2016-088111 A | 5/2016 |
| WO | 2011/152917 A2 | 12/2011 |
| WO | 2013/162839 A1 | 10/2013 |
| WO | 2016/013409 A1 | 1/2016 |
| WO | 2016/067489 A1 | 5/2016 |

OTHER PUBLICATIONS

International Search Report and Written Opinion of PCT Application No. PCT/JP2017/036379, dated Jan. 9, 2018, 10 pages of ISRWO.
Extended European Search Report for EP Patent Application No. 17866500.6, dated Oct. 7, 2019, 08 pages.
Office Action for CN Patent Application No. 201780066497.9, dated May 26, 2021, 11 pages of Office Action and 15 pages of English Translation.

* cited by examiner

CIRCUIT, BASE STATION, METHOD, AND RECORDING MEDIUM

CROSS REFERENCE TO RELATED APPLICATIONS

This application is a U.S. National Phase of International Patent Application No. PCT/JP2017/036379 filed on Oct. 5, 2017, which claims priority benefit of Japanese Patent Application No. JP 2016-216051 filed in the Japan Patent Office on Nov. 4, 2016. Each of the above-referenced applications is hereby incorporated herein by reference in its entirety.

TECHNICAL FIELD

The present disclosure relates to a circuit, a base station, a method, and a recording medium.

BACKGROUND ART

In recent years, research and development related to drones have been carried out and are attracting interest. Drones are small unmanned aircraft also known as unmanned aerial vehicles (UAVs). According to the economic reports published by the US Association for Unmanned Vehicle Systems International, the market size of drones was about 82 billion dollars in 2025 only in the US, and 1 hundred thousand new jobs are estimated to be created. Drones can provide products and information using air space which has not been used for any means on land, sea, or air. Therefore, drones are also called the industrial revolution of the air and are considered to be important business areas in the future.

For drones, high safety is required because the drones can fly in the sky above buildings or people. As a technology for improving safety related to flight vehicles, for example, Patent Literature 1 discloses a technology for instructing to an unmanned aircraft to use an efficient flight path to an airport stored in advance and having a predetermined facility such as a runway in an emergency situation such as fuel shortage.

CITATION LIST

Patent Literature

Patent Literature 1: JP 2014-181034A

DISCLOSURE OF INVENTION

Technical Problem

However, a system proposed in Patent Literature 1 is not suitable for a flight vehicle such as a drone in some cases. For example, because drones are small and can go up and down vertically, specific facilities such as airports are not essentially necessary. Further, for example, in consideration of the fact that general drones are light and are easily influenced by a gust of wind, or the like, a situation in which it is difficult to fly to a specific airport can occur suddenly. In such a situation, it is desirable to guarantee safety. Such a circumstance can also occur similarly in devices such as cleaning robots and pet robots that autonomously move, as well as flight vehicles such as drones.

Accordingly, the present disclosure provides a structure capable of further improving safety of a device that autonomously moves in an emergency situation.

Solution to Problem

According to the present disclosure, there is provided a circuit including: a report unit configured to report action-allowable time information regarding an action-allowable time to a base station; and an action control unit configured to control an action of a moving object on the basis of an action instruction decided on the basis of the reported action-allowable time information and notified of by the base station and to control an action with reference to a map in which a danger level for each place is defined in an emergency situation.

Moreover, according to the present disclosure, there is provided a base station including: an acquisition unit configured to acquire action-allowable time information regarding an action-allowable time of a terminal device; and a control unit configured to decide an action of the terminal device on the basis of the action-allowable time information and notify the terminal device of an action instruction, and notify the terminal device of a map in which a danger level for each place is defined and which is used in an emergency situation.

Moreover, according to the present disclosure, there is provided a method performed by a processor, the method including: reporting action-allowable time information regarding an action-allowable time to a base station; and controlling an action of a moving object on the basis of an action instruction decided on the basis of the reported action-allowable time information and notified of by the base station and controlling an action with reference to a map in which a danger level for each place is defined in an emergency situation.

Moreover, according to the present disclosure, there is provided a method performed by a processor, the method including: acquiring action-allowable time information regarding an action-allowable time of a terminal device; and deciding an action of the terminal device on the basis of the action-allowable time information and notifying the terminal device of an action instruction, and notifying the terminal device of a map in which a danger level for each place is defined and which is used in an emergency situation.

Moreover, according to the present disclosure, there is provided a recording medium having a program recorded therein causing a computer to function as: a report unit configured to report action-allowable time information regarding an action-allowable time to a base station; and an action control unit configured to control an action of a moving object on the basis of an action instruction decided on the basis of the reported action-allowable time information and notified of by the base station and to control an action with reference to a map in which a danger level for each place is defined in an emergency situation.

Moreover, according to the present disclosure, there is provided a recording medium having a program recorded therein causing a computer to function as: an acquisition unit configured to acquire action-allowable time information regarding an action-allowable time of a terminal device; and a control unit configured to decide an action of the terminal device on the basis of the action-allowable time information and notify the terminal device of an action instruction, and notify the terminal device of a map in which a danger level for each place is defined and which is used in an emergency situation.

Advantageous Effects of Invention

According to the present disclosure, as described above, it is possible to provide a structure capable of further improving safety of a device that autonomously moves in an emergency situation. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
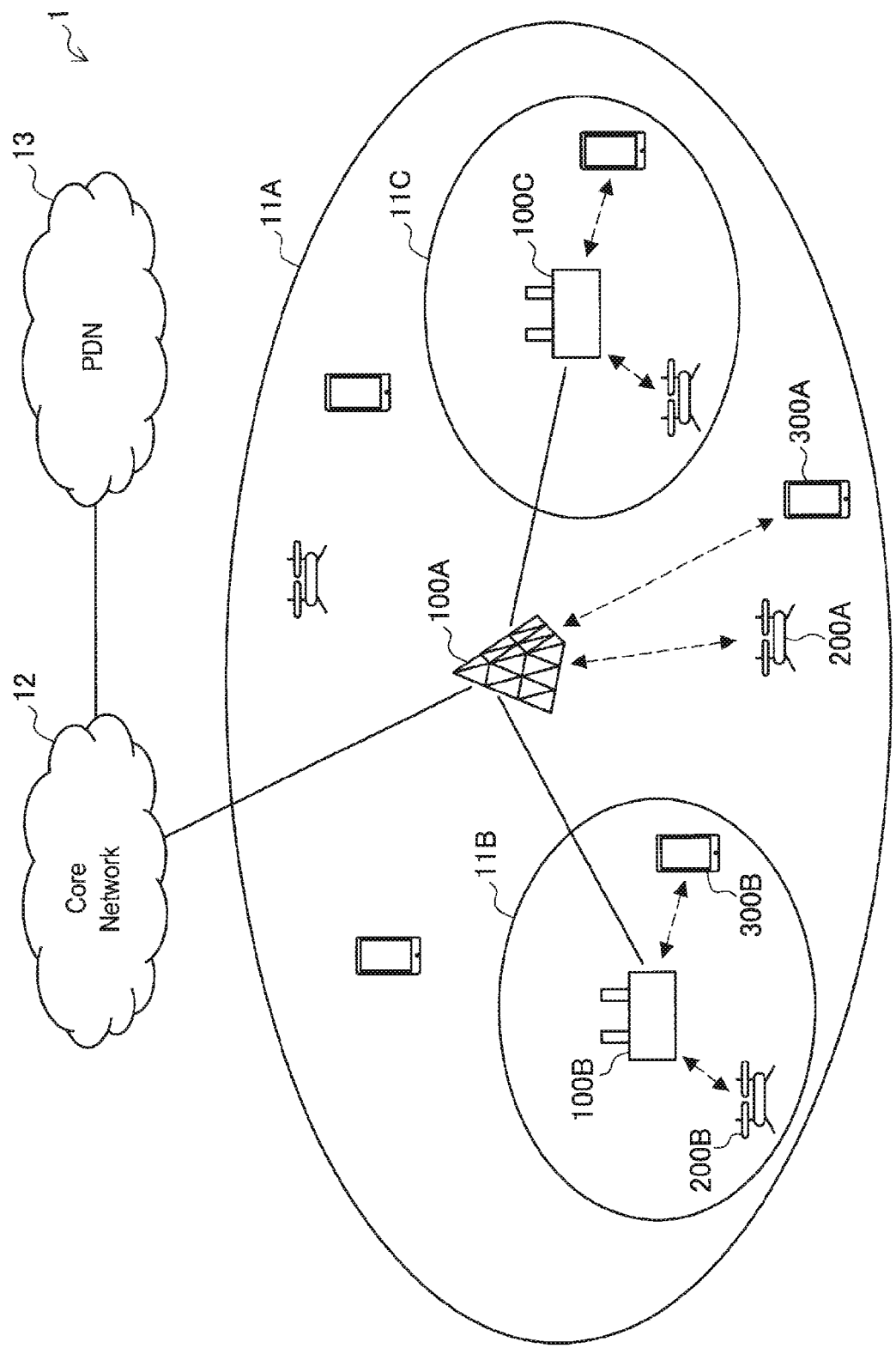
FIG. 1 is an explanatory diagram illustrating an example of a configuration of a system according to the present embodiment.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Introduction
1.1. Use cases of drone
1.2. Wireless communication by drone
1.3. General issues related to drone
2. Configuration example
2.1. System configuration example
2.2. Configuration example of base station
2.3. Configuration example of drone
3. Technical features
3.1. Basic operation
3.2. First action control method
3.2.1. Overview
3.2.2. Details
3.2.3. Specific example
3.3. Second action control method
3.3.1. Overview
3.3.2. Details
3.4. Third action control method
3.4.1. Overview
3.4.2. Details
3.4.3. Specific example
3.5. Crash map
3.6. Drone category
4. Application examples
5. Conclusion 1. Introduction 1.1. Use Cases of Drone Various use cases of a drone are considered. Hereinafter, examples of representative use cases will be described.
Entertainment
For example, a use case in which a bird's-eye view photo, a moving image, or the like, is captured by mounting a camera on a drone is considered. In recent years, it has become possible to easily perform photographing from viewpoint at which photographing was difficult before, such as dynamic photographing of sports events, or the like, from the ground.
Transportation
For example, a use case in which luggage is transported with a drone is considered. There is already a movement for starting service introduction.
Public Safety
For example, a use case such as surveillance, criminal tracking, or the like, is considered. Previously, there was also a movement for starting service introduction.

Informative

For example, a use case in which information is provided using a drone is considered. Research and development of a drone base station which is a drone operating as a base station are already being carried out. The drone base station can provide a wireless service to an area in which it is difficult to build an Internet circuit by providing the wireless service from the sky.

Sensing

For example, a use case of measurement performed using a drone is considered. Since measurement previously performed by humans can now also be performed collectively by a drone, efficient measurement can be performed.

Worker

For example, a use case in which a drone is used as a labor force is considered. For example, utilization of a drone for pesticide spraying or pollination in a variety of areas of the agricultural industry is expected.

Maintenance

For example, a use case in which maintenance is performed using a drone is considered. By using a drone, it is possible to perform maintenance of a location such as the back of a bridge in which it is difficult for humans to perform validation.

1.2. Wireless Communication by Drone

Utilization of a drone in the various cases has been examined above. In order to realize such use cases, various technical requests are imposed on the drone. Of the technical requests, communication can be exemplified particularly as an important request. Since a drone flies freely in 3-dimensional space, using wired communication is unrealistic and using wireless communication is assumed. Note that control (that is, remote manipulation) of a drone, supply of information from a drone, and the like, are considered as purposes of the wireless communication.

Communication by a drone is also referred to as drone to X (D2X) in some cases. Communication partners of a drone in the D2X communication are considered to be, for example, another drone, a cellular base station, a Wi-Fi (registered trademark) access point, a television (TV) tower, a satellite, a road side unit (RSU), and a human (or a device carried by a human), and the like. A drone can be remotely manipulated via device to device (D2D) communication with a device carried by a human. Further, a drone can also be connected to a cellular system or Wi-Fi for communication. In order to further broaden coverage, a drone may be a connected to a network in which a broadcast system such as TV is used or a network in which satellite communication is used, for communication. In this way, forming various communication links in a drone is considered.

1.3. General Issues Related to Drone

Until now, structures of wireless communication such as LTE and Wi-Fi have been designed on the assumption that terminal devices are used on the ground or a building, that is, terminal devices move in 2-dimensional spaces. In other words, the structures of wireless communication until now may not be said to be suitable for drones that freely fly in 3-dimensional spaces. In addition, in use cases specific to drones, such as "informative," introduction of a new communication scheme is expected. Accordingly, the structures of wireless communication are preferably expanded for drones.

2. Configuration Example

2.1. System Configuration Example

Hereinafter, an example of a configuration of a system according to the present embodiment will be described with reference to FIG. 1.

FIG. 1 is an explanatory diagram illustrating an example of a configuration of a system according to the present embodiment. As illustrated in FIG. 1, the system 1 according to the present embodiment includes a base station 100, a terminal device 200 and a terminal device 300.

A base station 100A is a macro cell base station which operates a macro cell 11A. The macro cell base station 100A is connected to a core network 12. The core network 12 is connected to a packet data network (PDN) 13 via a gateway device (not illustrated). The macro cell 11A may be operated in accordance with an arbitrary wireless communication scheme such as, for example, long term evolution (LTE), LTE-advanced (LTE-A) and 5G. Note that, it is assumed that 5G includes new radio (NR), new radio access technology (NRAT), and further evolved universal terrestrial radio access (FEUTRA).

Base stations 100B and 100C are small cell base stations which respectively operate a small cell 11B and a small cell 11C. The small cell base stations 100B and 100C are connected to the macro cell base station 100A. The small cells 11B and 11C may be operated in accordance with an arbitrary wireless communication scheme such as, for example, LTE, LTE-A and 5G.

The terminal devices 200 and 300 are devices which perform wireless communication by being connected to cells operated by the base station 100. As illustrated in FIG. 1, the terminal device 200 is a drone which flies freely in 3-dimensional space. Further, the terminal device 300 is a device such as a smartphone which is assumed to move on a 2-dimensional plane. In the following description, to distinguish between the terminal device 200 and the terminal device 300, the terminal device 200 will be also referred to as a drone 200. The drone 200 can transmit and receive data in real time in a broad coverage provided by, for example, cellular communication and receive control for autonomous flight by performing cellular communication. In an example illustrated in FIG. 1, a drone 200A and a terminal device 300A are connected to the macro cell 11A provided by the macro cell base station 100A, and a drone 200B and a terminal device 300B are connected to the small cell 11B provided by the small cell base station 100B.

Note that, in the following description, in the case where it is not particularly necessary to distinguish between the macro cell base station 100 and the small cell base station 100, these are collectively referred to as the base station 100.

2.2. Configuration Example of Base Station

Figure 2:
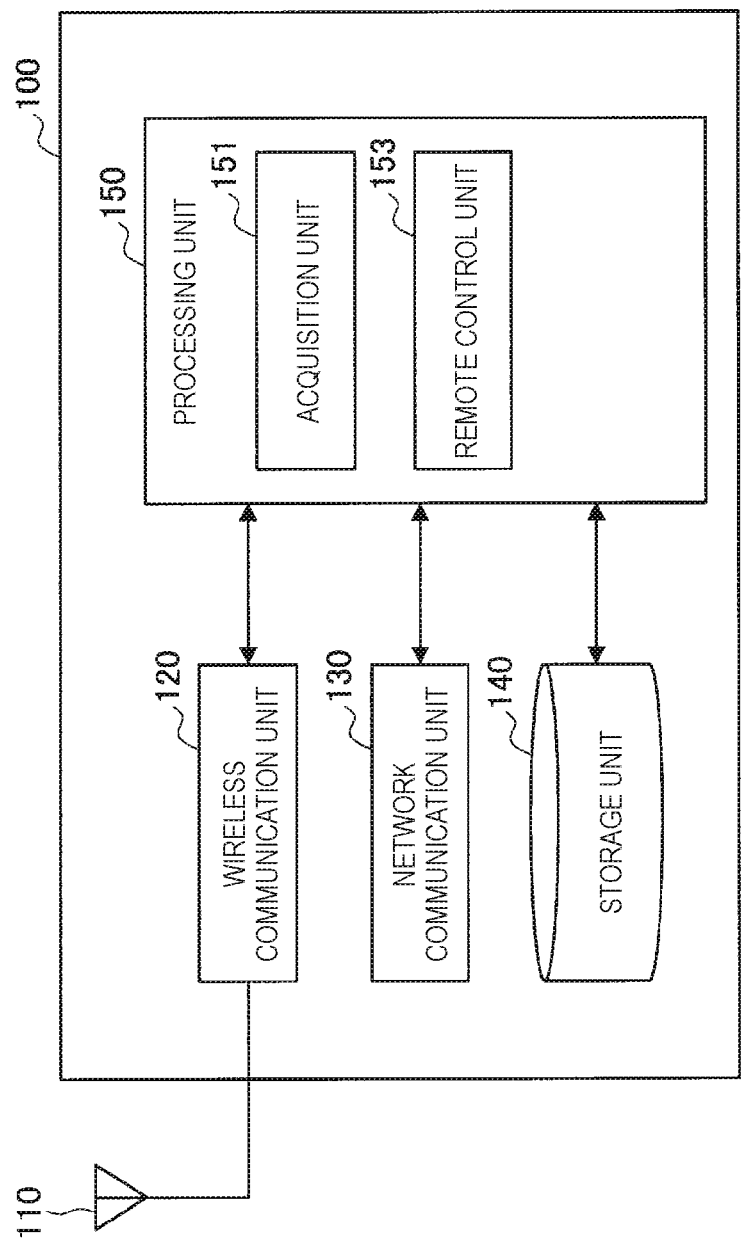
FIG. 2 is a block diagram illustrating an example of a logical configuration of a base station according to the present embodiment.

FIG. 2 is a block diagram illustrating an example of a logical configuration of the base station 100 according to the present embodiment. As illustrated in FIG. 2, the base station 100 includes an antenna unit 110, a wireless communication unit 120, a network communication unit 130, a storage unit 140 and a processing unit 150.

(1) Antenna Unit 110

The antenna unit 110 radiates a signal output from the wireless communication unit 120 to space as a radio wave. Further, the antenna unit 110 converts a radio wave in space into a signal and outputs the signal to the wireless communication unit 120.

(2) Wireless Communication Unit 120

The wireless communication unit 120 transmits and receives signals. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to other nodes, and receives information from other nodes. For example, the above-described other nodes include other base stations and core network nodes.

(4) Storage Unit 140

The storage unit 140 temporarily or permanently stores programs and various kinds of data for operation of the base station 100.

(5) Processing Unit 150

The processing unit 150 provides various functions of the base station 100. The base station 100 operates on the basis of control by the processing unit 150. The processing unit 150 includes an acquisition unit 151 and a remote control unit 153. Note that the processing unit 150 can further include constituent elements other than these constituent elements. That is, the processing unit 150 can perform operation other than operation of these constituent elements.

The acquisition unit 151 has a function of acquiring information regarding the drone 200 (state report to be described below). The remote control unit 153 has a function of remotely controlling an action of a moving object (for example, a flight vehicle such as the drone 200) which is a control target. These functions will be described in detail later.

2.3. Configuration Example of Drone

Figure 3:
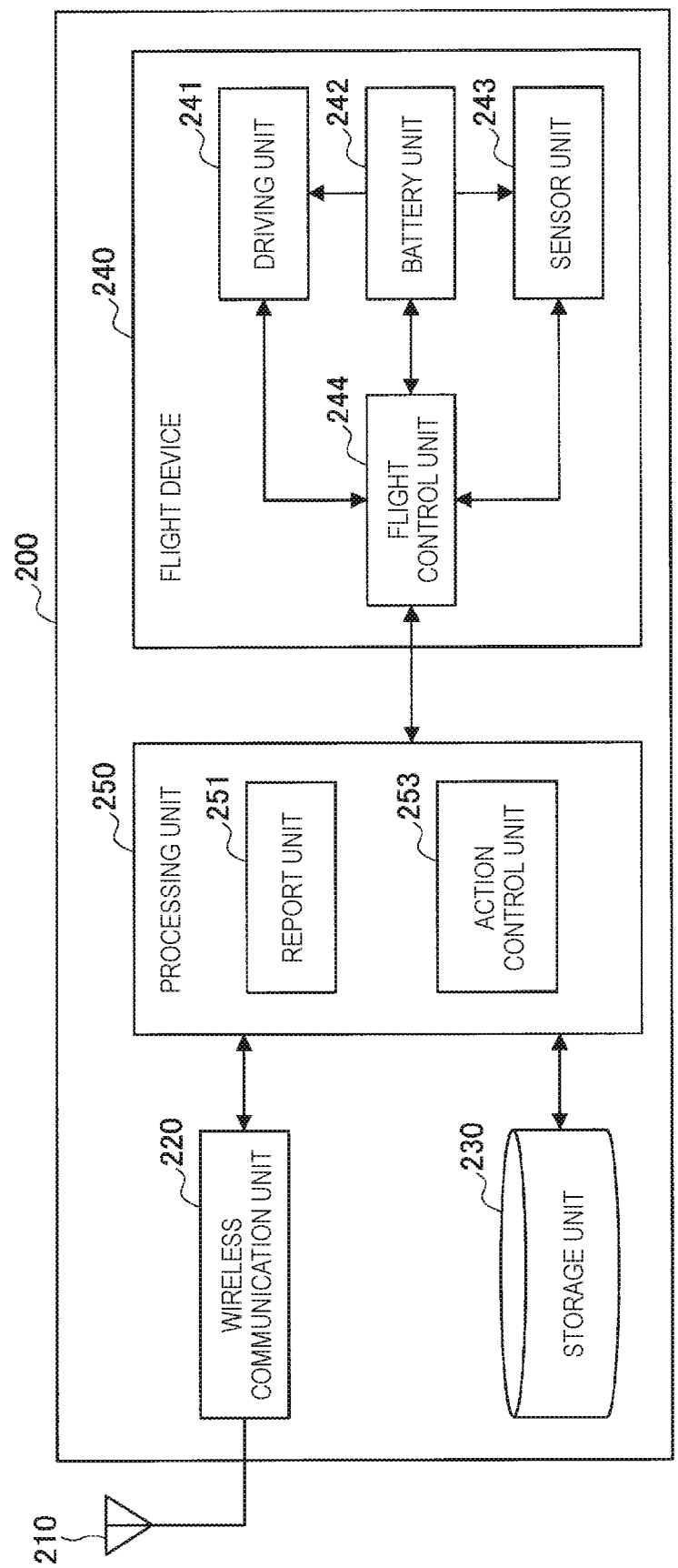
FIG. 3 is a block diagram illustrating an example of a logical configuration of a drone according to the present embodiment.

FIG. 3 is a block diagram illustrating an example of a logical configuration of the drone 200 according to the present embodiment. As illustrated in FIG. 3, the drone 200 according to the present embodiment includes an antenna unit 210, a wireless communication unit 220, a storage unit 230, a flight device 240 and a processing unit 250.

(1) Antenna Unit 210

The antenna unit 210 radiates a signal output from the wireless communication unit 220 to space as a radio wave. Further, the antenna unit 210 converts a radio wave in space into a signal and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores programs and various kinds of data for operation of the terminal device 200.

(4) Flight Device 240

The flight device 240 is a device that has a flight ability, that is, can fly. The flight device 240 includes a driving unit 241, a battery unit 242, a sensor unit 243, and a flight control unit 244.

The driving unit 241 performs driving for causing the drone 200 to fly. The driving unit 241 includes, for example, a motor, propeller, a transfer mechanism that transfers power of the motor to the propeller, and the like. The battery unit 242 supplies power to each constituent element of the flight device 240. The sensor unit 243 senses various kinds of information regarding a self-state or the periphery of the drone 200. For example, the sensor unit 243 includes a gyro sensor, an acceleration sensor, a positional information acquisition unit (for example, a signal positioning unit of the global navigation satellite system (GNSS)), an altitude sensor, a remaining battery sensor, a rotational sensor of the motor, and the like. The flight control unit 244 performs control for causing the drone 200 to fly. For example, the flight control unit 244 controls the driving unit 241 on the basis of sensor information obtained from the sensor unit 243 such that the drone 200 is caused to fly.

(5) Processing Unit 250

The processing unit 250 provides various functions of the terminal device 200. The processing unit 250 includes a report unit 251 and an action control unit 253. Note that the processing unit 250 can further include constituent elements other than these constituent elements. That is, the processing unit 250 can perform operation other than operation of these constituent elements.

The report unit 251 has a function of reporting information to the base station 100. Hereinafter, the information reported to the base station 100 is also referred to as a state report. The action control unit 253 has a function of controlling an action of the drone 200 which is a control target, that is, the drone 200 on which a processing unit 250 is mounted. Hereinafter, an action of the drone 200 performed under the control of the action control unit 253 is simply also referred to as an action of the drone 200. These functions will be described in detail later.

The processing unit 250 is connected to the flight device 240. The processing unit 250 may be realized as a processor, a circuit, an integrated circuit, or the like.

3. Technical Features 3.1. Basic Operation

The base station 100 remotely controls an action of the drone 200. Specifically, the base station 100 performs control to prevent the drone 200 from crashing or suppress harm to be as little as possible in the case of a crash. The drone 200 performs an action under the control of the base station 100. Thus, the drone 200 can guarantee safety particularly in an emergency situation.

As specific action control methods, the following three kinds of methods shown in Table 1 below are considered.

TABLE 1

Action control methods for drone

| Index | Position of drone | Drone | Relay node | Base station |
|---|---|---|---|---|
| 1 | Within coverage | Action execution function based on decision-making result | | Decision-making function Notification function of decision-making result |
| 2 | Outside of coverage | Action execution function based on decision-making result | Relay function | Decision-making function Notification function of decision-making result |
| 3 | Within/ outside of coverage | Decision-making function Action execution function based on decision-making result | | Notification function of decision-making rule |

The first action control method is a method in which the base station 100 takes charge of a decision-making function and a notification function of a decision-making result and the drone 200 takes charge of an action execution function on the basis of a decision-making result. Specifically, the drone 200 (for example, the report unit 251) first transmits a state report to the base station 100 and the base station 100 (for example, the acquisition unit 151) acquires the state report. Subsequently, the base station 100 (for example, the remote control unit 153) performs decision-making in accordance with a decision-making rule and notifies the drone 200 of the decision-making result. A decision-making target is an action of the drone 200 (more exactly, a future action). Then, the drone 200 (for example, the action control unit 253) executes an action on the basis of the decision-making result from the base station 100.

A second action control method is a method in which the base station 100 takes charge of a decision-making function and a notification function of a decision-making result, a relay node takes charge of a relay function, and the drone 200 takes charge of an action execution function based on the decision-making result. Specifically, the drone 200 (for example, the report unit 251) first transmits a state report to the drone 200 via the relay node and the base station 100 (for example, the acquisition unit 151) acquires the state report. Subsequently, the base station 100 (for example, the remote control unit 153) performs decision-making in accordance with a decision-making rule and notifies the drone 200 of the decision-making result via the relay node. Then, the drone 200 (for example, the action control unit 253) performs an action on the basis of the decision-making result from the base station 100. In particular, in the present method, the relay node relays communication between the base station 100 and the drone 200.

A third action control method is a method in which the base station 100 takes charge of a notification function of a decision-making rule and the drone 200 takes charge of a decision-making function and an action execution function based on a decision-making result. Specifically, the base station 100 (for example, the remote control unit 153) first notifies the drone 200 of the decision-making rule. Then, the drone 200 (for example, the action control unit 253) performs decision-making in accordance with the decision-making rule and performs an action on the basis of the decision-making result.

Note that, as the decision-making rule, for example, a mapping table to be described below is adopted. Additionally, any decision-making method such as a neural network may be adopted.

Hereinafter, each method will be described specifically.

3.2. First Action Control Method

3.2.1. Overview

Figure 4:
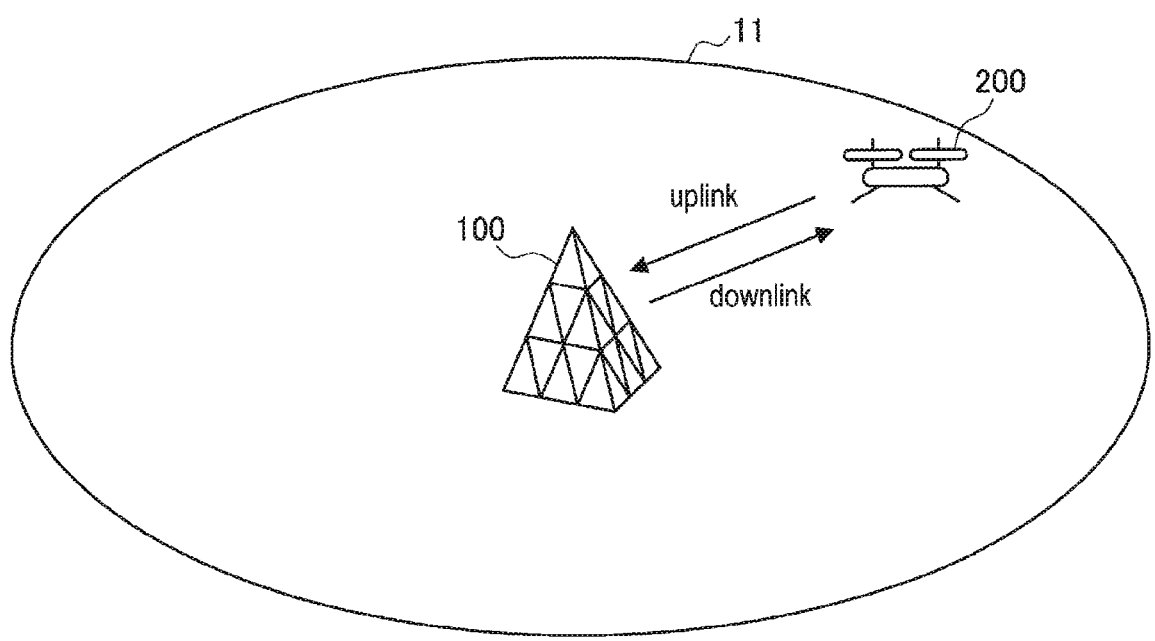
FIG. 4 is an explanatory diagram illustrating a first action control method according to the present embodiment.

FIG. 4 is an explanatory diagram illustrating the first action control method according to the present embodiment. As illustrated in FIG. 4, the drone 200 is located inside the cell 11 operated by the base station 100, that is, within the coverage, to transmit and receive an uplink signal and a downlink signal to and from the base station 100. The first action control method is adopted in a case in which the drone 200 is located within the coverage of the base station 100. Hereinafter, a flow of the first action control method will be described with reference to FIG. 5.

Figure 5:
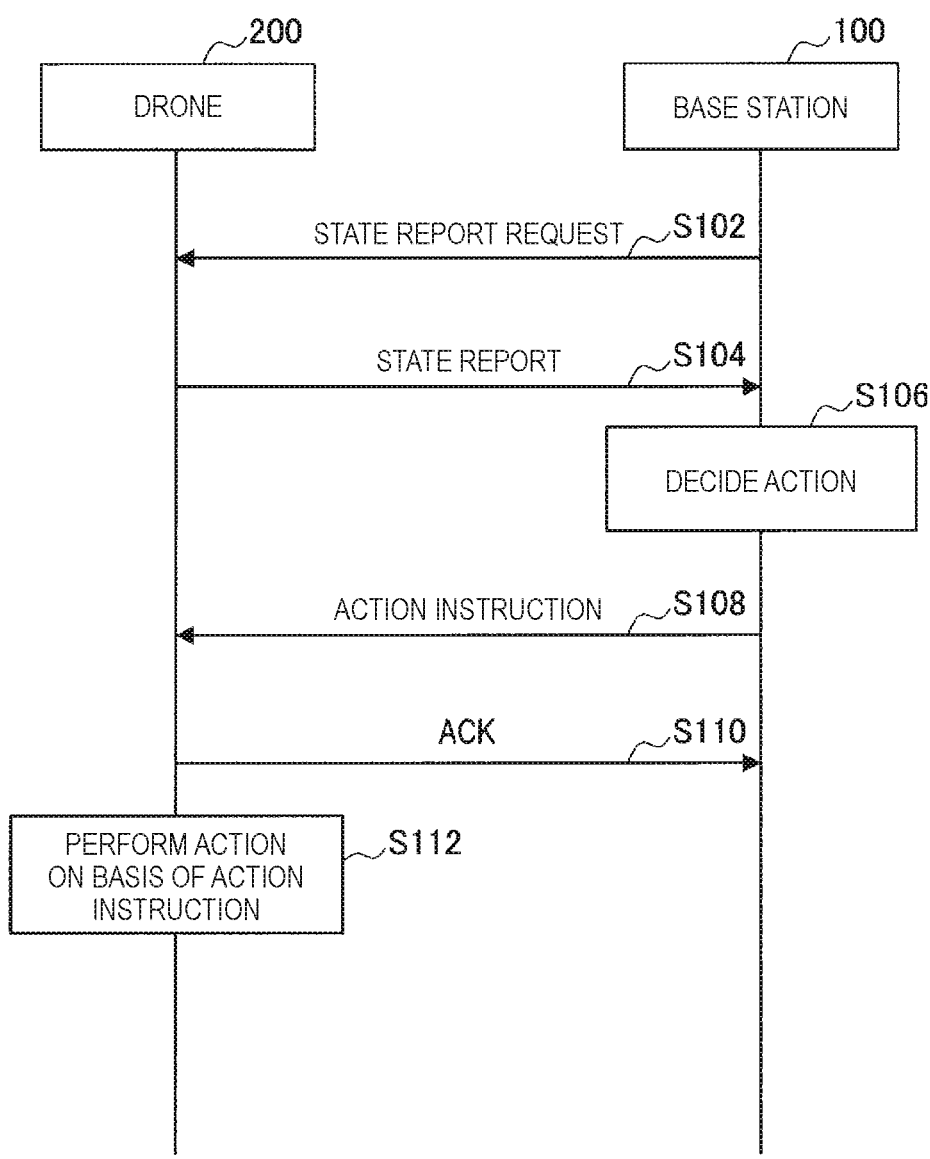
FIG. 5 is a sequence diagram illustrating an example of the flow of the first action control method performed in the system according to the present embodiment.

FIG. 5 is a sequence diagram illustrating an example of the flow of the first action control method performed in the system 1 according to the present embodiment. As illustrated in FIG. 5, the base station 100 and the drone 200 are involved in the present sequence.

First, the base station 100 transmits a state report request to the drone 200 (step S102). Subsequently, the drone 200 transmits a state report to the base station 100 (step S104). Subsequently, the base station 100 decides an action of the drone 200 on the basis of the state report received from the drone 200 (step S106) and transmits an action instruction indicating a decision result to the drone 200 (step S108). Subsequently, in a case in which reception of the action instruction from the base station 100 succeeds, the drone 200 transmits an acknowledgement (ACK, that is, a positive response) to the base station 100. Then, the drone 200 performs an action based on the action instruction received from the base station 100 (step S110).

Hereinafter, the details of each process described with reference to FIG. 5 will be described.

3.2.2. Details (1) State Report Request

The base station 100 transmits the state report request for reporting the state report to the drone 200 located within the self-coverage. The base station 100 may broadcast the state report request to an unspecified large number of drones 200, may multicast the state report request to a plurality of specific drones 200, or may unicast the state report request to one specific drone 200. For example, the state report request may be transmitted using a radio resource control (RRC) message or may be transmitted using downlink control information (DCI).

The state report request includes information for instructing an instruction of information for requesting a report from the drone 200. For example, with regard to the state report request, a report of action-allowable time information regarding a time in which the drone 200 can act (for example, a time in which an action such as flight or photographing is possible) is requested. In a case in which the action-allowable time information includes a plurality of kinds of information, the state report request includes information for designating information in which a report is requested among the plurality of kinds of information.

The state report request may be transmitted periodically at a fixed period or a dynamically adjusted period.

The state report request may be transmitted in conformity with an event trigger scheme. As a transmission trigger, new connection to the base station 100 is considered. In addition, as the transmission trigger, the base station 100 recognizing an apparent change in an environment such as heavy rain or strong wind is considered. In addition, as the transmission trigger, a previous state report request being transmitted and then the base station 100 not succeeding in reception of the state report from the drone 200 even after a predetermined period elapses is considered.

(2) State Report

The drone 200 reports various kinds of information to the base station 100. For example, the drone 200 reports the action-allowable time information regarding a time in which the drone 200 can act to the base station 100. The drone 200 may also report information other than the action-allowable time information to the base station 100. For example, the state report may be transmitted using a physical uplink control channel (PUCCH) or may be transmitted using a physical uplink shared channel (PUSCH).

The action-allowable time information can include various parameters. The action-allowable time information includes at least battery information. The battery information is information regarding the battery unit 242. Specifically, the battery information includes, for example, at least one parameter of information indicating a residual battery amount, information indicating a maximum battery capacity, and information indicating power consumption per unit time. In addition, the drone 200 may have, for example, a power generation source such as a solar panel. The battery information may include a parameter related to a generated power amount, a parameter indicating a relation between the generated power amount and a power consumption amount, or the like. In addition, the action-allowable time information may include a parameter indicating an action-allowable time with a numerical value without change (a flight-allowable remaining time in the case of flight).

In addition, the action-allowable time information can include a parameter related to a state or a peripheral environment of the drone 200 in addition to battery information. For example, the action-allowable time information regarding the state of the drone 200 may include at least one of a size (dimensions), a shape, a weight, a material, a shape, a flight altitude, a flight speed, acceleration, a flight direction, a current action, or the like of the drone 200. In addition, action time information regarding the state of the drone 200 may include 3-dimensional geographic information (latitude, longitude, and altitude), the number of propellers, an azimuth, a zenith, an elevation, or the like. Note that, as the current action, flight, photographing, baggage transport, military or detection inspection, takeoff, landing, or the like is considered. On the other hand, the action time information regarding the peripheral environment may include at least one of a temperature, a pressure, rainfall, a wind speed, or a wind direction. In addition, the action time information regarding the peripheral environment may include humidity, visibility, electromagnetic-field strength, electromagnetic-field distribution, nuclear radiation, other weather information (rain, fog, thunder, snow, and hail), or the like.

Note that the parameters may be detected by the drone 200 to be reported or may be estimated by the base station 100 on the basis of the information reported from the drone 200. In addition, once a parameter such as a shape for which a change is rare is reported, the report may be omitted subsequently.

Table 2 below shows examples of sensors mounted on the drone 200 and parameters to be sensed.

TABLE 2

Examples of sensors

| Kinds | Sensors | Sensed parameters |
| --- | --- | --- |
| Sensors targeting self-state | GPS | Geographic position |
| | Altitude sensor | Flight altitude |
| | Speed sensor | Flight speed |
| | Acceleration sensor | Acceleration |
| | Gyro sensor | Angular velocity |
| | Tilt sensor | Flight angle |
| | Load sensor | Load |
| | Battery sensor | Residual battery amount |
| | Internal temperature sensor | Internal temperature |
| Sensors targeting peripheral environment | Image sensor | Peripheral image |
| | External temperature sensor | External temperature |
| | Pressure sensor | Atmospheric pressure |
| | Humidity sensor | Relative humidity |
| | Optical sensor | Illumination |
| | Visibility sensor | Visibility |
| | Electric field sensor | Electric field parameter |
| | Magnetic field sensor | Magnetic field parameter |
| | Wind speed sensor | Wind speed |
| | Wind direction sensor | Wind direction |

The action-allowable time information may be expressed with an absolute value or a relative value. For example, the residual battery amount and the maximum battery capacity may each be expressed with an absolute value. In addition, the residual battery amount may be expressed as a relative value which is a ratio of a residual amount to a maximum capacity.

The drone 200 may control precision of the action time information (for example, calculation precision or expression precision of the foregoing parameter). For example, as the action-allowable time is shorter, the precision of the action time information may be higher (for example, action time information is calculated with high precision or is expressed with high precision). Specifically, in a case in which the residual pattern amount is low, the drone 200 further improves the precision of the parameter. Thus, the drone 200 can report a parameter with high precision in a case in which a crash risk is higher, thereby contributing to a reduction in the increased crash risk.

In general, the drone 200 receives a state report request from the base station 100 and transmits a state report including information requested in the received state report request to the base station 100. In a case in which it is difficult to transmit the requested information, the drone 200 transmits a negative acknowledgement (NACK, that is, a negative response) to the base station 100. Of course, the state report is preferably transmitted rather than the NACK.

Conversely, the drone 200 may transmit the state report to the base station 100 without receiving the state report request.

For example, the drone 200 can transmit the state report request using recognition of a change in the self-state or the peripheral environment as a trigger even when the drone 200 does not receive the state report request. Examples of the transmission trigger include new connection to a network, an increase in altitude, acceleration of a flight speed, handover, a sudden change in temperature, humidity, atmospheric pressure, or the like, and the like. In this case, the action-allowable time information transmitted as a state report also preferably includes a parameter other than the battery information such as temperature.

In addition, the drone 200 can periodically transmit the state report to the base station 100 even when the drone 200 does not receive the state report request. For example, the drone 200 always monitors the self-state and transmits the state report at a period set in advance by the base station 100 while continuously flying as safely as possible. The transmission period of the state report may be changed on the basis of the battery information, weather, or the like. For example, in a case in which the residual battery amount is considerably low, the drone 200 transmits the state report to the base station 100 more frequently. Thus, the drone 200 can transmit the state report more frequently in a case in which a crash risk is higher, thereby contributing to a reduction in the increased crash risk.

The drone 200 switches a report method depending on whether the drone 200 is located within the coverage or outside of the coverage of the base station 100. For example, the drone 200 performs direct reporting in a case in which the drone 200 is located within the coverage of the base station 100. Thus, the drone 200 can minimize a time lag from the transmission of the state report to reception of an action instruction.

(3) Decision-Making

The base station 100 makes a decision related to the drone 200 when the base station 100 receives the state report from the drone 200. Specifically, the base station 100 decides an action of the drone 200 on the basis of the state report. For example, the decision of the action based on the state report is performed with reference to the mapping table in which a combination of a condition related to the state report and an action to be decided in a case in which the condition is satisfied is defined. The mapping table is set in advance by the base station 100 or a network (more specifically, any control node on a core network or an IP network).

The mapping table includes a plurality of conditions related to a state report (in general, action-allowable time information). The base station 100 decides an action associated with a satisfied condition among conditions related to the action-allowable time information as an action (more exactly, a future action) of the drone 200.

For example, the base station 100 decides continuous flight in a case in which the action-allowable time information satisfies a condition in which continuous safe flight is determined to be possible during a period until the drone 200 performs safe landing, and decides landing in other cases. For example, in a case in which the residual battery amount of the drone 200 is found to be equal to or greater than a threshold with reference to the mapping table shown in Table 3 below, the base station 100 decides continuous flight. In a case in which the residual battery amount is less than the threshold, the base station 100 decides emergency landing. In the mapping table, a condition related to comparison between the residual battery amount and the threshold is associated with an action. Specifically, the case in which the residual battery amount is equal to or greater than the threshold is associated with the continuous flight. The case in which the residual battery amount is less than the threshold is associated with the emergency landing.

TABLE 3

First example of mapping table

| Condition related to comparison between residual battery amount r and threshold θ | Action |
|---|---|
| Residual battery amount r ≥ θ | Continuous flight |
| Residual battery amount r < θ | Emergency landing |

In addition, in the mapping table, as shown in Table 4 below, a condition including a combination of a plurality of parameters may be associated with an action.

TABLE 4

Second example of mapping table

| Condition related to self-state | Condition related to peripheral environment | Action |
|---|---|---|
| Residual battery amount r1, geographic information (x1, y2, z3), weight m1, speed v1, in flight, in load delivery | Temperature T1, humidity H1, atmospheric pressure P1 | Continuous flight |
| Residual battery amount r2, geographic information (x2, y2, z2), weight m2, speed v2, in flight, photographing | Temperature T2, humidity H2, atmospheric pressure P2 | Emergency landing |

In addition, in the mapping table, as shown in Table 5 below, a condition including a combination of a plurality of thresholds may be associated with an action.

TABLE 5

Third example of mapping table

| Condition related to comparison between residual battery amount r and thresholds θ1 and θ2 (θ1 < θ2) | Action |
|---|---|
| Residual battery amount r < θ1 | Emergency landing |
| θ1 ≤ residual battery amount r < θ2 | Continuous flight, landing within 10 minutes |
| Residual battery amount r ≥ θ2 | Continuous flight |

The actions defined in the mapping table include at least an action in a maintaining mode in which the action is maintained and an action in a landing mode in which landing is performed. The maintaining mode can include an all-maintaining mode in which all the current actions continue and a power-saving mode in which some of the current actions continue. In addition, the landing mode can include a preparative landing mode including predetermined landing preparation and an emergency landing mode not including the predetermined landing preparation. Furthermore, in the mapping table, an action in a helping mode and any action such as load delivery or photographing can also be defined. Note that t the drone 200 acting in the emergency landing mode is synonymous with at the drone 200 performing emergency landing. In addition, the base station 100 instructing the drone 200 to act in the emergency landing mode is synonymous with the base station 100 instructing the drone 200 to perform emergency landing. The same applies to the other action modes. Hereinafter, each action mode will be described in detail.

In the all-maintaining mode, the drone 200 continues current actions until a subsequent state report is transmitted. Thereafter, the drone 200 acts on the basis of an action instruction based on the subsequently transmitted state report.

In the power-saving mode, the drone 200 stops or changes unnecessary actions among the current actions and continues only necessary actions. For example, the drone 200 is assumed to receive an action instruction for giving an instruction of an action in the power-saving mode in a situation in which the drone 200 is flying while performing photographing. In this case, for example, the drone 200 slows a flight speed, slows performance (for example, a dynamic range, a resolution, or the like) of the photographing, or stops the photographing and continues only the flight to guarantee safety.

In the preparative landing mode, the drone 200 stops all actions other than actions related to landing and communication with the base station 100. Then, the drone 200 performs landing preparation under the control of the base station 100 while continuously transmitting a state report to the base station 100 at a short period for careful landing preparation, and then performs the landing. Note that another nearby drone 200 collects and records information regarding the drone 200 performing the landing for the purpose of future self-use.

In the emergency landing mode, the drone 200 stops all actions other than actions related to landing or communication with the base station 100. Then, the drone 200 performs the landing without performing predetermined landing preparation. On this account, the drone 200 immediately generates or selects a landing pattern in which damage received or damage caused in the periphery is minimized. The landing pattern includes an appropriate landing direction, landing speed, landing target, landing path, and the like. Thereafter, the drone 200 performs emergency landing (including crashing). At this time, the drone 200 announces a warning to the periphery using a warning lamp, a warning sound or the like.

In the emergency landing mode, a crash map is used. The crash map is a map that is used in an emergency situation and is a map in which a danger level assumed in the case of movement to a place is defined for each peripheral place. The drone 200 controls an action with reference to the crash map in an emergency situation. In the case of the drone 200 that flies, the crash map is a map in which a danger level is defined in a case in which the drone 200 lands on each peripheral place. Referring to the crash map, the drone 200 in flight performs emergency landing, targeting a place with a lower danger level. In a case in which the drone 200 uses a place with a low danger level as a landing place, the drone 200 can be recovered safely and easily. For example, a place with the lowest danger level is a place in which there are no or few buildings. Note that the other nearby drone 200 collects and records information regarding the drone 200 performing the landing for the purpose of future self-use. For example, the other nearby drone 200 can update the crash map on the basis of the collected and recorded information.

Note that the crash map is initially generated by the base station 100 and the drone 200 is notified of the crash map. The crash map may be updated dynamically. For example, the crash map may be updated by the base station 100. In this case, the base station 100 notifies the drone 200 of the newly generated crash map again and updates the crash map. In addition, the drone 200 may update the crash map by itself. For example, the drone 200 updates the crash map on the basis of any event such as detection of danger, for example, in a place considered to be safe in the crash map.

In the helping mode, the drone 200 performs a helping request or helping. For example, the drone 200 acts in the helping mode on a side that makes a request for helping in a case in which the action-allowable time is less than a predetermined threshold. Specifically, the drone 200 requests another drone 200 or a power supply station to supply power. At this time, the drone 200 notifies of urgency to perform interruption. The power supply station is a device that has a purpose of supplying power to another device and can move. The drone 200 may further request another drone 200 or the power supply station to visit its own location. Of course, the drone 200 may move to the power supply station. The power may be supplied in a wired manner or may be supplied wirelessly. In addition, the drone 200 may report so-called flight data to the base station 100. In addition, the drone 200 may make a request for physically exchanging the battery unit 242. The helping request may be transmitted continuously until the helping becomes unnecessary. On the other hand, the drone 200 can act even in the helping mode under a predetermined condition on the side that performs the helping. For example, the drone 200 supplies power in response to a direct helping request from another drone 200 or an indirect helping request via the base station 100. The drone 200 that performs the helping may be designated by the drone 200 that makes the helping request or may be designated by the base station 100.

The action mode may be changed in a case in which the state or the peripheral environment of the drone 200 is changed. For example, in a case in which power is supplied, the drone 200 may change the action mode from the landing mode to the flight mode.

(3) Action Instruction

The base station 100 transmits a decision-making result related to the drone 200 to the drone 200. Specifically, the base station 100 notifies the drone 200 of an action instruction to perform the decided action.

(4) ACK

The drone 200 transmits ACK to the base station 100 when the drone 200 receives the action instruction from the base station 100. In addition, in a case in which the instructed action is different from a current action, the drone 200 stops the current action immediately or after a predetermined time elapses, and starts the instructed action.

(5) Execution of Action

The drone 200 controls an action of the drone 200 on the basis of an action instruction decided on the basis of the reported action-allowable time information and notified of by the base station 100. That is, the drone 200 acts in accordance with the action instruction.

3.2.3. Specific Example (1) First Specific Example

Figure 6:
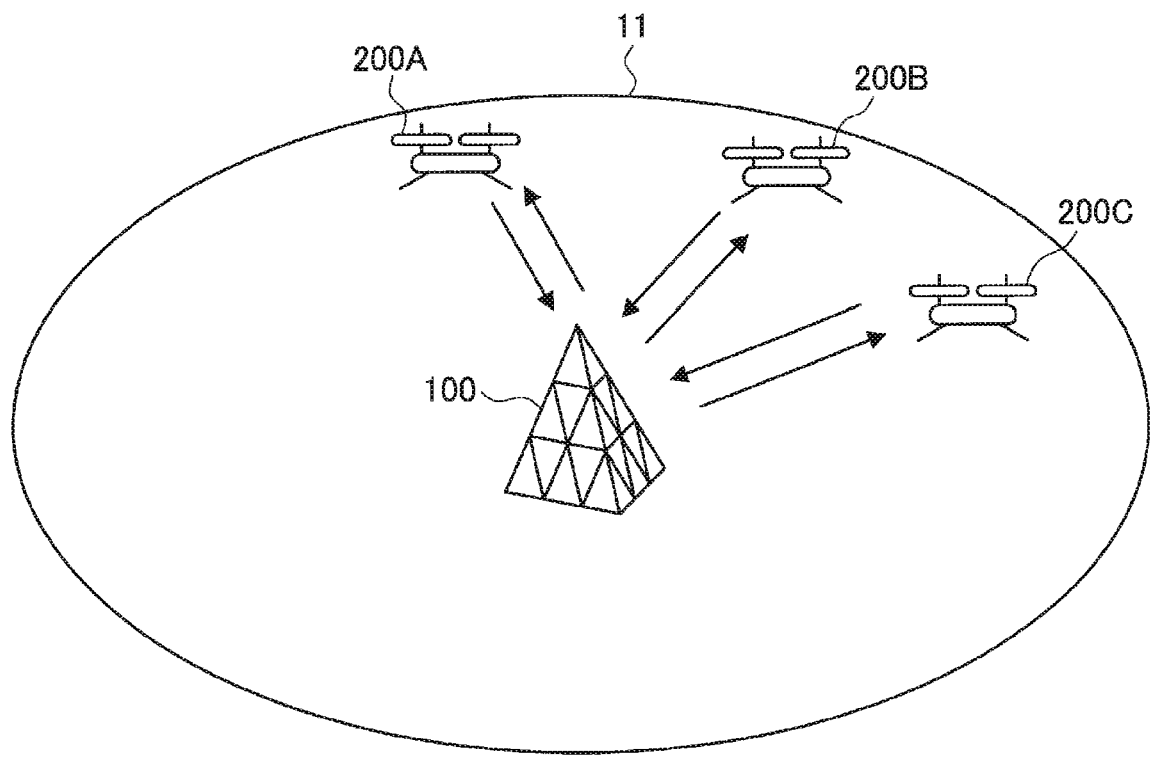
FIG. 6 is an explanatory diagram illustrating a first specific example of the first action control method according to the present embodiment.

FIG. 6 is an explanatory diagram illustrating a first specific example of the first action control method according to the present embodiment. As illustrated in FIG. 6, the present specific example is an example in which a situation in which a plurality of drones 200 (that is, 200A, 200B, and 200C) is located within the cell 11, that is, the coverage, and transmit and receive uplink signals and downlink signals to and from the base station 100 is assumed.

In the present specific example, the mapping table is assumed to include only conditions related to the comparison between the residual battery amount and the threshold. Here, in the mapping table, one threshold is assumed to be used. A specific example of the mapping table is shown in Table 6 below. Note that a timer related to a response of the state report is assumed to be 500 milliseconds.

TABLE 6

Example of mapping table ($\theta$ = 30%)

| Condition related to comparison between residual battery amount r and threshold $\theta$ ($\theta$ = 30%) | Action |
| --- | --- |
| residual battery amount r ≥ $\theta$ | Continuous flight |
| residual battery amount r < $\theta$ | Emergency landing |

It is assumed that the base station 100 transmits a state report request to the drones 200A, 200B, and 200C and state reports shown in Table 7 below are responded.

TABLE 7

Examples of state reports

| Drone | Request transmission time | Residual battery amount |
| --- | --- | --- |
| Drone 200A | t0 | 15% |
| Drone 200B | t0 | 80% |
| Drone 200C | t0 | — |

Referring to the state reports in the mapping table, the base station 100 instructs the drone 200A of which a residual battery amount is less than 30% to perform emergency landing and instructs the drone 200B of which a residual battery amount is equal to or greater than 30% to continue flight (that is, to continue a current action). In a case in which the state report is not received within t0+500 milliseconds from the drone 200C, the base station 100 retransmits the state report request to the drone 200C.

(2) Second Specific Example

Figure 7:
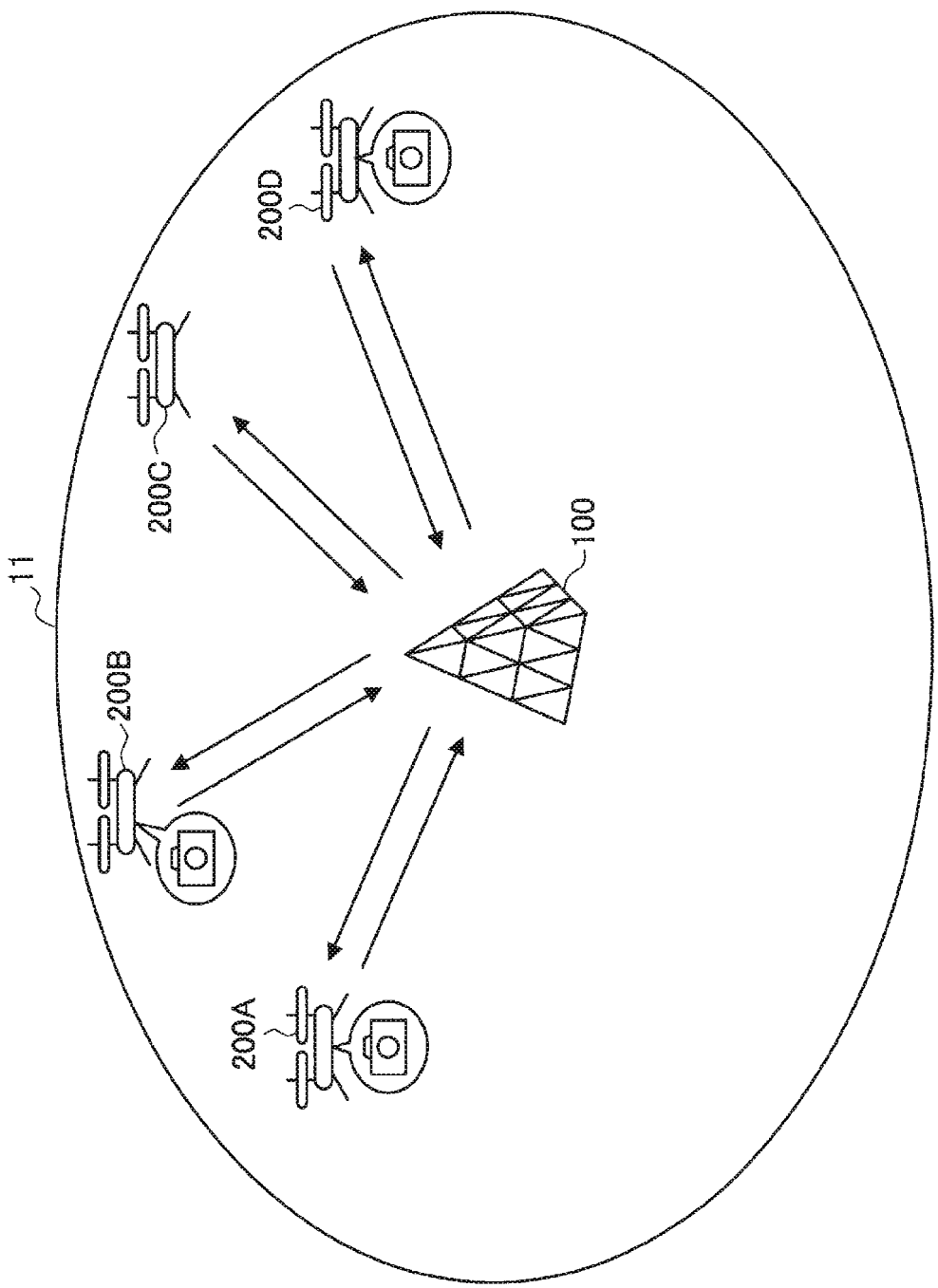
FIG. 7 is an explanatory diagram illustrating a second specific example of the first action control method according to the present embodiment.

FIG. 7 is an explanatory diagram illustrating a second specific example of the first action control method according to the present embodiment. As illustrated in FIG. 7, the present specific example is an example in which a situation in which the plurality of drones 200 (that is, 200A, 200B, 200C, 200D) are located within the cell 11, that is, the coverage, and transmit and receive uplink signals and downlink signals to and from the base station 100 is assumed. The drones 200A, 200B, and 200D have a camera function and are flying while performing photographing. On the other hand the drone 200C has no camera function and is simply flying.

In the present specific example, the mapping table is assumed to include only the condition related to the residual battery amount. Here, in the mapping table, a plurality of thresholds is assumed to be used. A specific example of the mapping table is shown in Table 8 below. Note that a timer related to a response of the state report is assumed to be 500 milliseconds.

TABLE 8

Example of mapping table

| Condition related to comparison between residual battery amount (ratio to maximum battery amount) r and threshold | Action |
| --- | --- |
| residual battery amount r ≥ 60% | Maintaining mode |
| 40% ≤ residual battery amount r < 60% | Power-saving mode |
| 20% ≤ residual battery amount r < 40% | Preparative landing |
| residual battery amount r < 20% | Emergency landing |

It is assumed that the base station 100 transmits a state report request to the drones 200A, 200B, 200C, and 200D and state reports shown in Table 9 below are responded from each drone.

TABLE 9

Examples of state reports

| Drone | Request transmission time | Residual battery amount (ratio to maximum battery capacity) |
| --- | --- | --- |
| Drone 200A | t0 | 80% |
| Drone 200B | t0 | 50% |
| Drone 200C | t0 | 20% |
| Drone 200D | t0 | 5% |

The base station 100 decides an action of each drone 200 with reference to the state report in the mapping table and gives an instruction. For example, the base station 100 instructs the drone 200A of which the residual battery amount is equal to or greater than 60% to continue a current action. Thus, the drone 200A maintains, for example, a flight speed, a flight altitude, a flight direction, and various photographing parameters. In addition, the base station 100 instructs the drone 200B of which the residual battery amount is equal to or greater than 40% and less than 60% to perform an action in the power-saving mode. Thus, for example, the drone 200B slows the flight speed, lowers the flight altitude, and/or lowers photographing parameters such as a dynamic range and a resolution. In addition, the base station 100 instructs the drone 200C of which the residual battery amount is equal to or greater than 20% and less than 40% to perform preparation landing. Thus, the drone 200C performs the landing preparation to land. In addition, the base station 100 instructs the drone 200D of which the residual battery amount is less than 20% to perform emergency landing. Thus, the drone 200D stops all the actions other than an action related to landing. Then, the drone 200D selects an optimum landing pattern and starts an emergency landing process. In the emergency landing process, the drone 200D announces a warning to the periphery.

(3) Third Specific Example

The present specific example is an example in which a situation similar to the situation assumed in the first specific example described with reference to FIG. 6 is assumed.

In the present specific example, the drone 200 is located within the coverage of the base station 100 and the mapping table is assumed to include the conditions other than the condition related to the residual battery amount. A specific example of the mapping table is shown in Table 10 below. Note that a timer related to a response of the state report is assumed to be 500 milliseconds.

TABLE 10

Example of mapping table

| Condition related to comparison between residual battery amount (ratio to maximum battery amount) and threshold | Gross weight (including load) | Wind speed | Action |
| --- | --- | --- | --- |
| <40% | <5 kg | >10 m/s | Landing |
| <40% | >5 kg | >10 m/s | Landing |
| >40% | >5 kg | >10 m/s | Landing |
| >40% | <5 kg | >10 m/s | Landing |
| <40% | <5 kg | <10 m/s | Landing |
| <40% | >5 kg | <10 m/s | Landing |
| >40% | <5 kg | <10 m/s | Continuous flight |
| >40% | >5 kg | <10 m/s | Landing |

It is assumed that the base station 100 transmits a state report request to the drones 200A, 200B, and 200C and state reports shown in Table 11 below are responded.

TABLE 11

Examples of state reports

| Drone | Residual battery amount (ratio to maximum battery amount) | Gross weight (including load) | Wind speed |
| --- | --- | --- | --- |
| Drone 200A | 50% | 3 kg | 12 m/s |
| Drone 200B | 50% | 2 kg | 0.5 m/s |
| Drone 200C | 15% | 2 kg | 0.5 m/s |

Referring to the state reports in the mapping table, the base station 100 instructs the drones 200A and 200C to land and instructs the drone 200B to continue the flight.

3.3. Second Action Control Method 3.3.1. Overview

Figure 8:
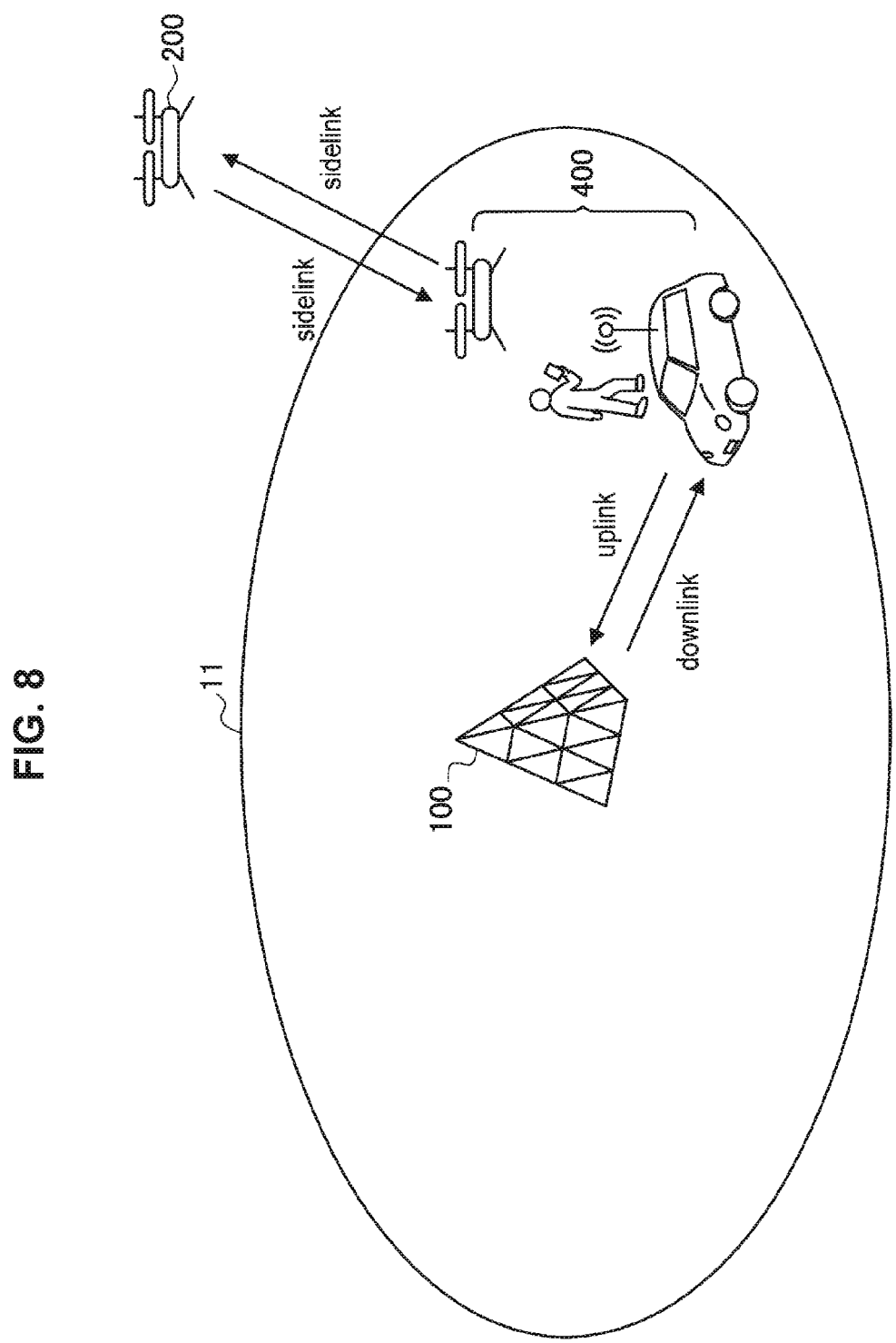
FIG. 8 is an explanatory diagram illustrating a second action control method according to the present embodiment.

FIG. 8 is an explanatory diagram illustrating the second action control method according to the present embodiment.

As illustrated in FIG. 8, the drone 200 is located outside of the cell 11 operated by the base station 100, that is, outside of the coverage and communicates with the base station 100 via a relay node 400. Specifically, the drone 200 establishes a sidelink with the relay node 400 to transmit and receives signals, and the relay node 400 transmits and receives an uplink signal and a downlink signal to and from the base station 100. As illustrated in FIG. 8, the relay node 400 may be a vehicle, a device carried by a pedestrian, a drone, or the like. In addition, the relay node 400 may be any device such as infrastructure equipment such as a road side unit (RSU), an airplane, or a satellite. The second action control method is adopted in such a case in which the drone 200 is located outside of the coverage of the base station 100. Hereinafter, a flow of the second action control method will be described with reference to FIG. 9.

Figure 9:
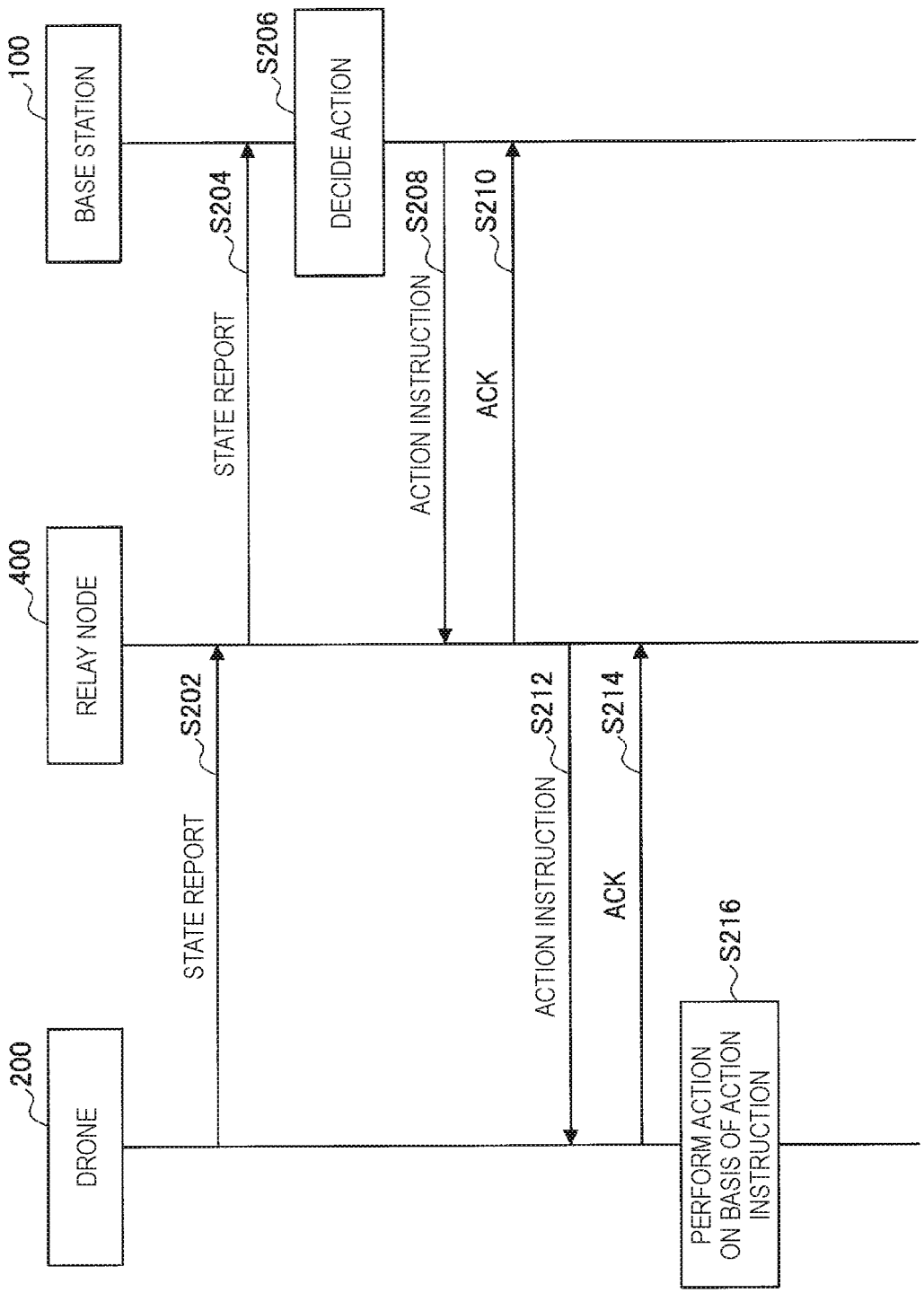
FIG. 9 is a sequence diagram illustrating an example of a flow of the second action control method performed in the system according to the present embodiment.

FIG. 9 is a sequence diagram illustrating an example of a flow of the second action control method performed in the system 1 according to the present embodiment. As illustrated in FIG. 9, the base station 100, the drone 200, and the relay node 400 are involved in the present sequence.

First, the drone 200 transmits a state report to the relay node 400 (step S202). Subsequently, the relay node 400 relays the state report received from the drone 200 to the base station 100 (step S204). Subsequently, the base station 100 decides an action of the drone 200 on the basis of the received state report (step S206) and transmits an action instruction indicating a decision result to the relay node 400 (step S208). Subsequently, when the relay node 400 receives the action instruction, the relay node 400 responds to the base station 100 with ACK (step S210) and relays the received action instruction to the drone 200 (step S212). Then, when the drone 200 receives the action instruction, the drone 200 responds to the relay node 400 with ACK (step S214) and performs an action based on the received action instruction (step S216).

Hereinafter, the details of each process described with reference to FIG. 9 will be described.

3.3.2. Details (1) Relay Node

The drone 200 switches a report method depending on whether the drone 200 is located within the coverage or outside of the coverage of the base station 100. For example, in a case in which the drone 200 is located outside of the coverage of the base station 100, the drone 200 performs indirect reporting via the relay node 400. Thus, even in the case in which the drone 200 is located outside of the coverage, the drone 200 can report the state report to the base station 100.

First, a case in which the relay node 400 is located within the coverage will be described. The relay node 400 transmits a signal received from the drone 200 outside of the coverage to the base station 100 and transmits a signal received from the base station 100 to the drone 200 outside of the coverage. Note that a role of the relay node 400 can be set in advance by the base station 100. For example, the base station 100 sets a device that is caused to function as the relay node 400 and an area which is in charge of the device. Here, for the coverage which is supplied to the drone 200, an altitude is considered, of course. This is because a change can occur in a direction from the inside of the coverage to the outside of the coverage or its reverse direction in accordance with a flight altitude of the drone 200. Therefore, as the relay node 400, a flight vehicle such as the drone 200 of which an altitude can be adjusted is more appropriate than a thing which is installed on the ground at a fixed altitude.

In general, it is difficult for the drone 200 outside of the coverage to receive a state report request from the base station 100. Accordingly, for example, the drone 200 may transmit the state report periodically. A transmission period can be set in advance by, for example, the base station 100 or a network. In addition, the drone 200 may transmit the state report request using recognition of a change in the self-state or a peripheral environment as a trigger.

In a case in which the drone 200 recognizes that the drone 200 is located outside of the coverage, the drone 200 broadcasts a state report to the periphery. In a case in which the relay node 400 receives the broadcast state report, the relay node 400 relays the state report to the base station 100. The state report transmitted to the relay node 400 preferably includes a parameter such as identification information for identifying the drone 200 which is a transmission source. Thus, the relay node 400 can relay feedback from the base station 100 to the appropriate drone 200.

The case in which the relay node 400 is located within the coverage has been described above. Next, a case in which the relay node 400 is located outside of the coverage will be described.

The relay node 400 comes and goes within and outside of the coverage to relay communication between the base station 100 and the drone 200 outside of the coverage. In this case, the relay node 400 can be referred to as a moving relay. The relay node 400 can be realized as any moving object. Here, for example, a case in which the drone 200 outside of the coverage functions as the relay node 400 will be described with reference to FIG. 10.

Figure 10:
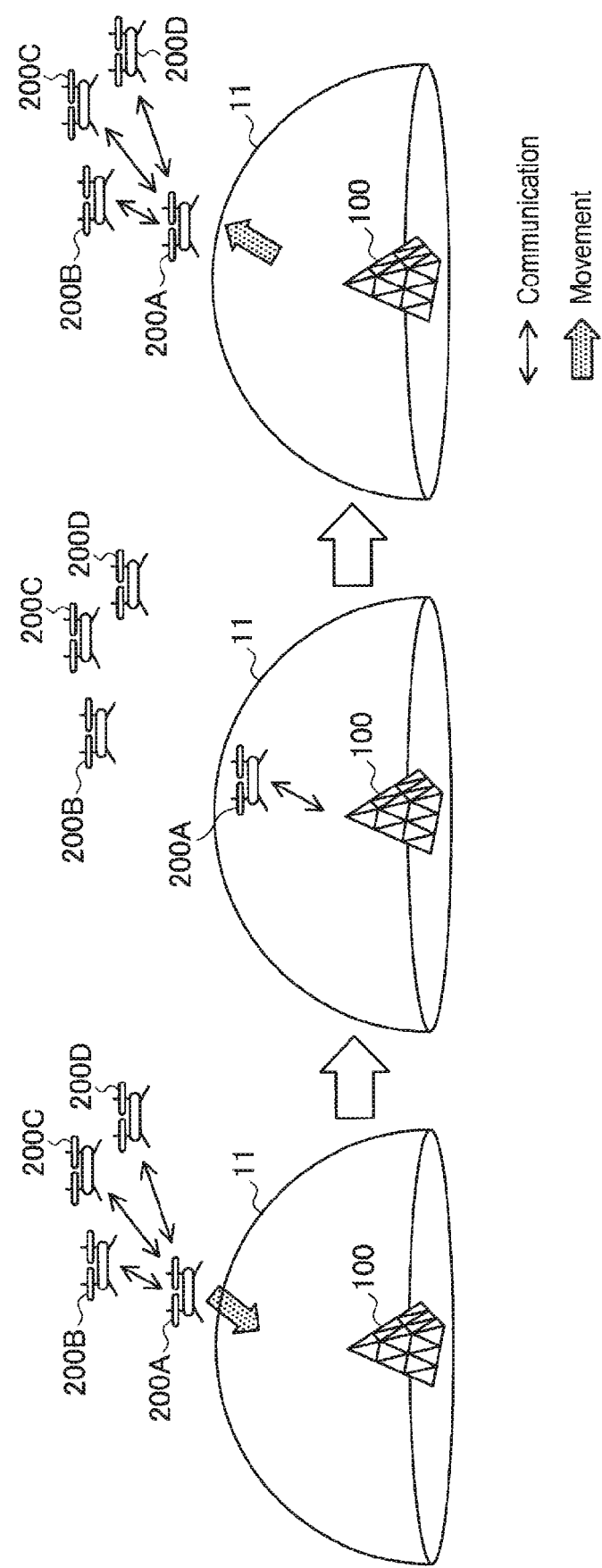
FIG. 10 is an explanatory diagram illustrating the second action control method according to the present embodiment.

FIG. 10 is an explanatory diagram illustrating the second action control method according to the present embodiment. As illustrated in the left drawing of FIG. 10, the drones 200A, 200B, 200C, and 200D are located outside of the cell 11 operated by the base station 100, that is, outside of the coverage, and thus it is difficult to communicate directly with the base station 100.

Accordingly, the relay node 400 is selected from the plurality of drones 200 outside of the coverage. Hereinafter, the drone 200 selected as the relay node 400 is also referred to as a representative. The representative may be set in advance by the base station 100 or may be autonomously selected by the drone 200. In any case, the representative is selected on the basis of a predetermined selection rule. Various selection rules are considered. For example, the representative may be selected in sequence alternately from the plurality of drones 200 which are selection candidates. In this case, any drone 200 is selected periodically as the representative. Additionally, the representative may be selected on the basis of a predetermined standard such as a drone which is the closest to the base station 100 or is in an idle state in which a particular action is not performed. The drone 200 selected as the representative notifies the other nearby drones 200 that the drone 200 is selected as the representative (for example, performs broadcasting). Here, for example, the drone 200A is assumed to be selected as the representative.

As illustrated in the left drawing of FIG. 10, the drone 200A which is the representative collects state reports from the other drones 200B, 200C, and 200D outside of the coverage. That is, the drones 200B, 200C, and 200D transmit the state reports to the representative.

Subsequently, as illustrated in the middle drawing of FIG. 10, the drone 200A which is the representative moves into the cell 11. Then, the drone 200A relays (that is, reports) the state reports of the drones 200 including the self-drone outside of the coverage to the base station 100. The base station 100 makes a decision related to the drones 200A, 200B, 200C, and 200D outside of the coverage on the basis of the received state reports and transmits an action instruction indicating a decision-making result to the drone 200A.

Thereafter, as illustrated in the right drawing of FIG. 10, the drone 200A returns outside of the coverage. Then, the drone 200A transmits the action instruction received from the base station 100 to each of the drones 200B, 200C, and 200D.

Note that the plurality of drones 200 may be selected as the representative. In this case, which representative relays the state reports of which drones 200 outside of the coverage is preferably set.

(2) Retransmission Control

In the second action control method, a failure of communication caused since the base station 100 and the drone 200 do not directly communicate can occur. Accordingly, it is preferable to perform retransmission in response to the failure of communication between the base station 100 and the relay node 400 or between the relay node 400 and the drone 200. Hereinafter, four variations of the failure of communication will be described in sequence.

First Example

When the drone 200 transmits a state report to the relay node 400, the drone 200 causes a timer with a length T1 to operate. In a case in which a response to the state report is not received within T1 is not received, the drone 200 retransmits the state report. A flow of the process in this case will be described with reference to FIG. 11.

Figure 11:
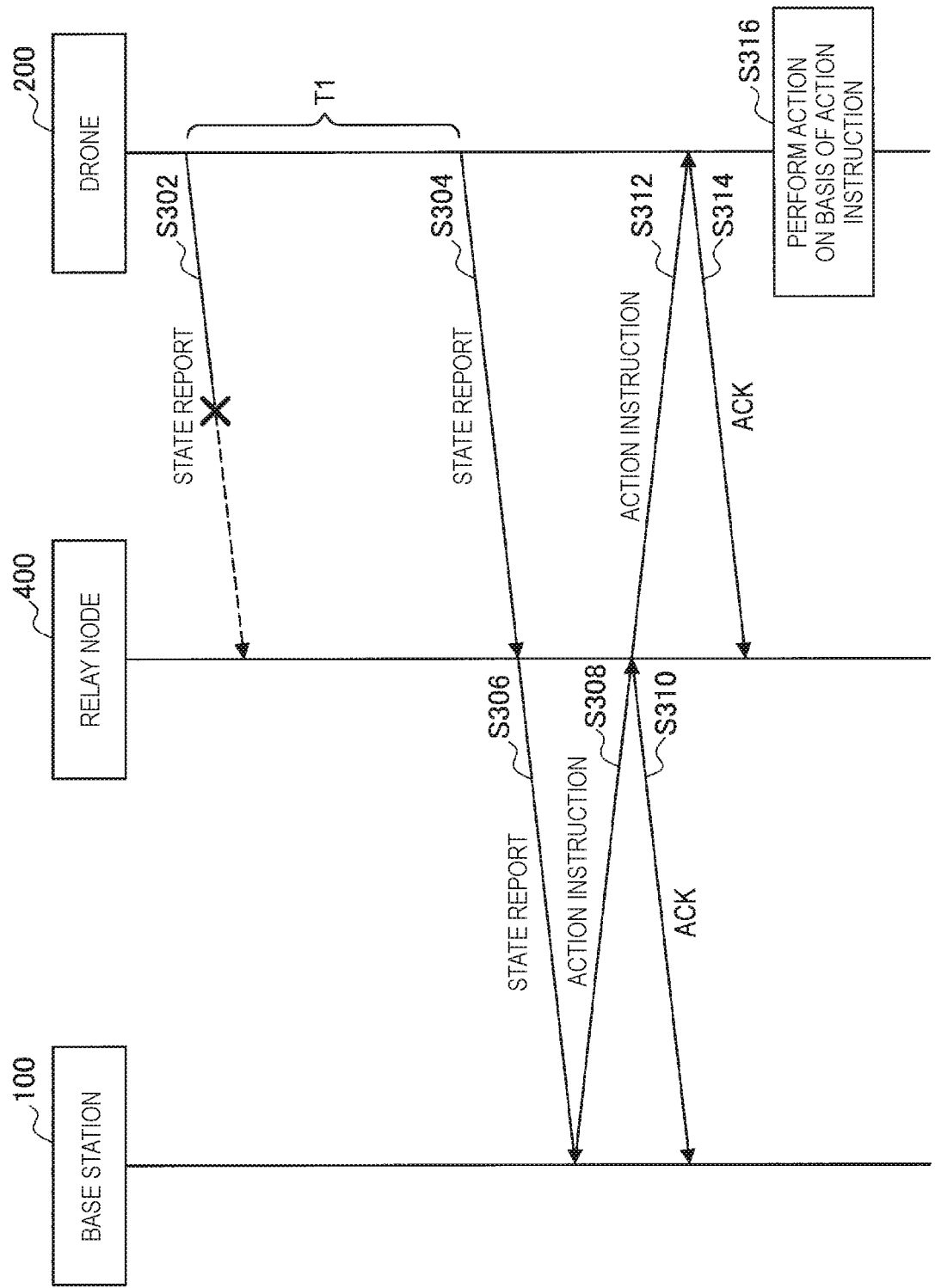
FIG. 11 is a sequence diagram illustrating an example of a flow of a retransmission control process performed in the system according to the present embodiment.

FIG. 11 is a sequence diagram illustrating an example of a flow of a retransmission control process performed in the system 1 according to the present embodiment. As illustrated in FIG. 11, the base station 100, the drone 200, and the relay node 400 are involved in the present sequence.

First, the drone 200 transmits a state report to the relay node 400 (step S302) and causes a timer with the length T1 to operate. In a case in which the timer expires before reception of a response to the transmitted state report, the drone 200 retransmits the state report to the relay node 400 (step S304). Subsequently, the relay node 400 relays the state report received from the drone 200 to the base station 100 (step S306). Subsequently, the base station 100 decides an action of the drone 200 on the basis of the received state report and transmits an action instruction indicating a decision result to the relay node 400 (step S308). Subsequently, when the relay node 400 receives the action instruction, the relay node 400 responds to the base station 100 with ACK (step S310) and relays the received action instruction to the drone 200 (step S312). Then, when the drone 200 receives the action instruction, the drone 200 responds to the relay node 400 with ACK (step S314) and performs the action based on the received action instruction (step S316).

Second Example

When the relay node 400 transmits a state report to the base station 100, the relay node 400 causes a timer with a length T2 to operate. In a case in which a response to the state report is not received within T2 is not received, the relay node 400 retransmits the state report. A flow of the process in this case will be described with reference to FIG. 12.

Figure 12:
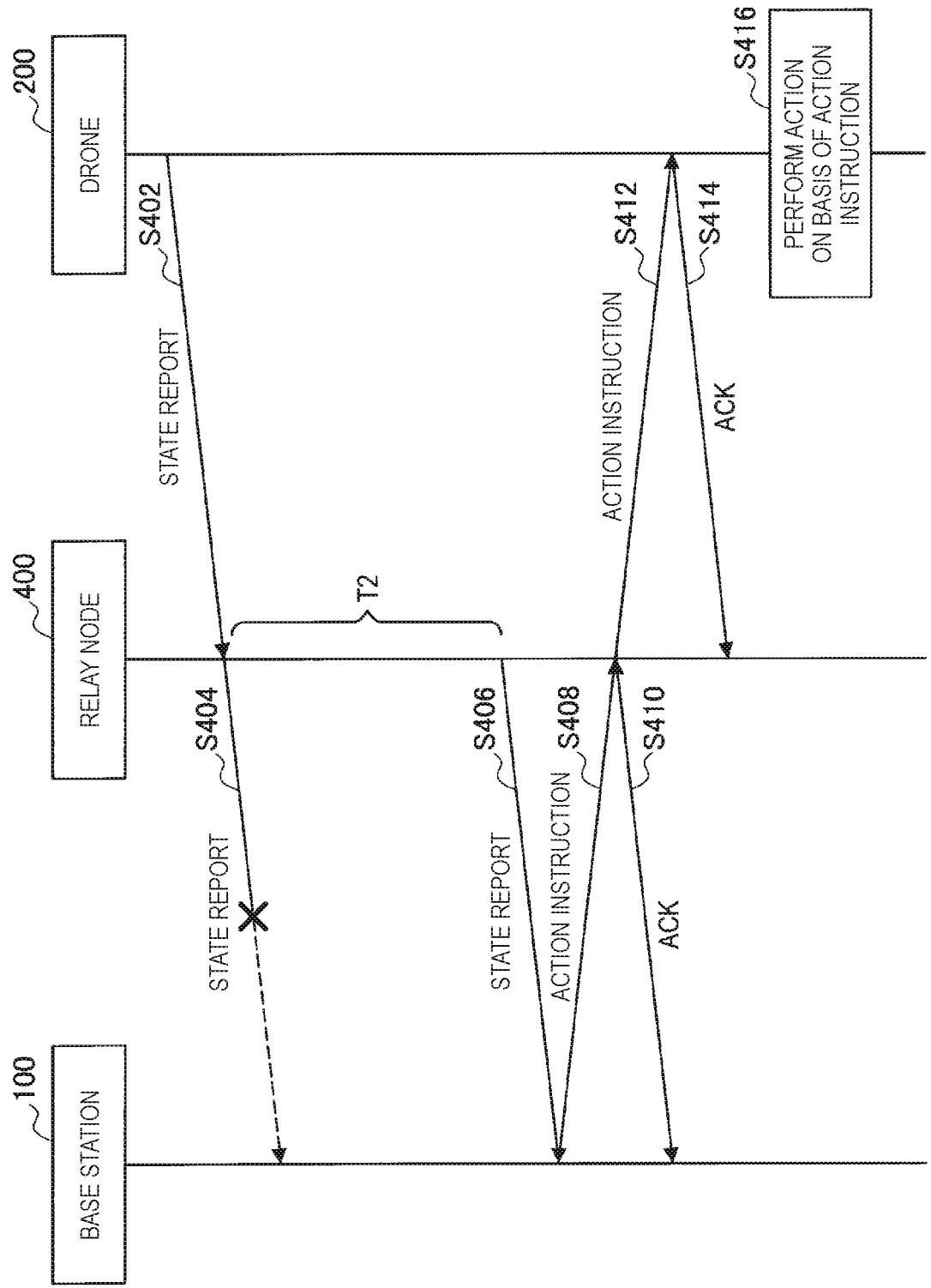
FIG. 12 is a sequence diagram illustrating an example of a flow of a retransmission control process performed in the system according to the present embodiment.

FIG. 12 is a sequence diagram illustrating an example of a flow of a retransmission control process performed in the system 1 according to the present embodiment. As illustrated in FIG. 12, the base station 100, the drone 200, and the relay node 400 are involved in the present sequence.

First, the drone 200 transmits a state report to the relay node 400 (step S402). Subsequently, the relay node 400 relays the state report received from the drone 200 to the base station 100 (step S404) and causes a timer with the length T2 to operate. In a case in which the timer expires before reception of a response to the transmitted state report, the relay node 400 retransmits the state report to the base station 100 (step S406). Subsequently, the base station 100 decides an action of the drone 200 on the basis of the received state report and transmits an action instruction indicating a decision result to the relay node 400 (step S408). Subsequently, when the relay node 400 receives the action instruction, the relay node 400 responds to the base station 100 with ACK (step S410) and relays the received action instruction to the drone 200 (step S412). Then, when the drone 200 receives the action instruction, the drone 200 responds to the relay node 400 with ACK (step S414) and performs the action based on the received action instruction (step S416).

Third Example

When the base station 100 transmits an action instruction for a state report to the relay node 400, the base station 100 causes a timer with a length T3 to operate. In a case in which ACK to the action instruction is not received within T3, the base station 100 retransmits the action instruction. A flow of the process in this case will be described with reference to FIG. 13.

Figure 13:
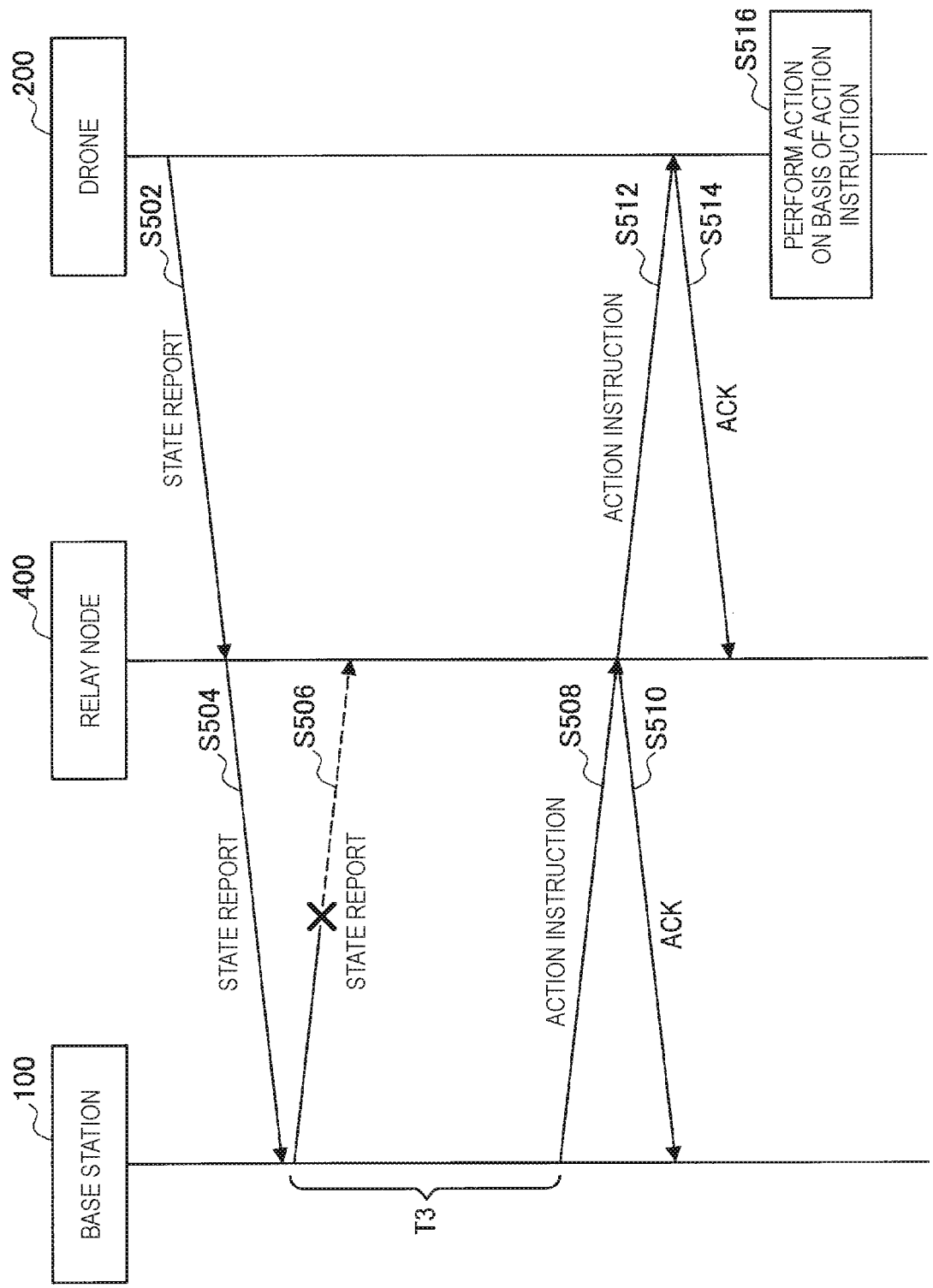
FIG. 13 is a sequence diagram illustrating an example of a flow of a retransmission control process performed in the system according to the present embodiment.

FIG. 13 is a sequence diagram illustrating an example of a flow of a retransmission control process performed in the system 1 according to the present embodiment. As illustrated in FIG. 13, the base station 100, the drone 200, and the relay node 400 are involved in the present sequence.

First, the drone 200 transmits the state report to the relay node 400 (step S502). Subsequently, the relay node 400 relays the state report received from the drone 200 to the base station 100 (step S504). Subsequently, the base station 100 decides an action of the drone 200 on the basis of the received state report, transmits an action instruction indicating a decision result to the relay node 400 (step S506), and causes the timer with the length T3 to operate. In a case in which the time expires before reception of ACK to the transmitted action instruction, the base station 100 retransmits the action instruction to the relay node 400 (step S508). Subsequently, when the relay node 400 receives the action instruction, the relay node 400 responds to the base station 100 with ACK (step S510) and relays the received action instruction to the drone 200 (step S512). Then, when the drone 200 receives the action instruction, the drone 200 responds to the relay node 400 with ACK (step S514) and performs the action based on the received action instruction (step S516).

Fourth Example

When the relay node 400 transmits an action instruction for the sate report to the drone 200, the relay node 400 causes a timer with a length T4 to operate. In a case in which ACK to the action instruction is not received within T4, the relay node 400 retransmits the action instruction. A flow of the process in this case will be described with reference to FIG. 14.

Figure 14:
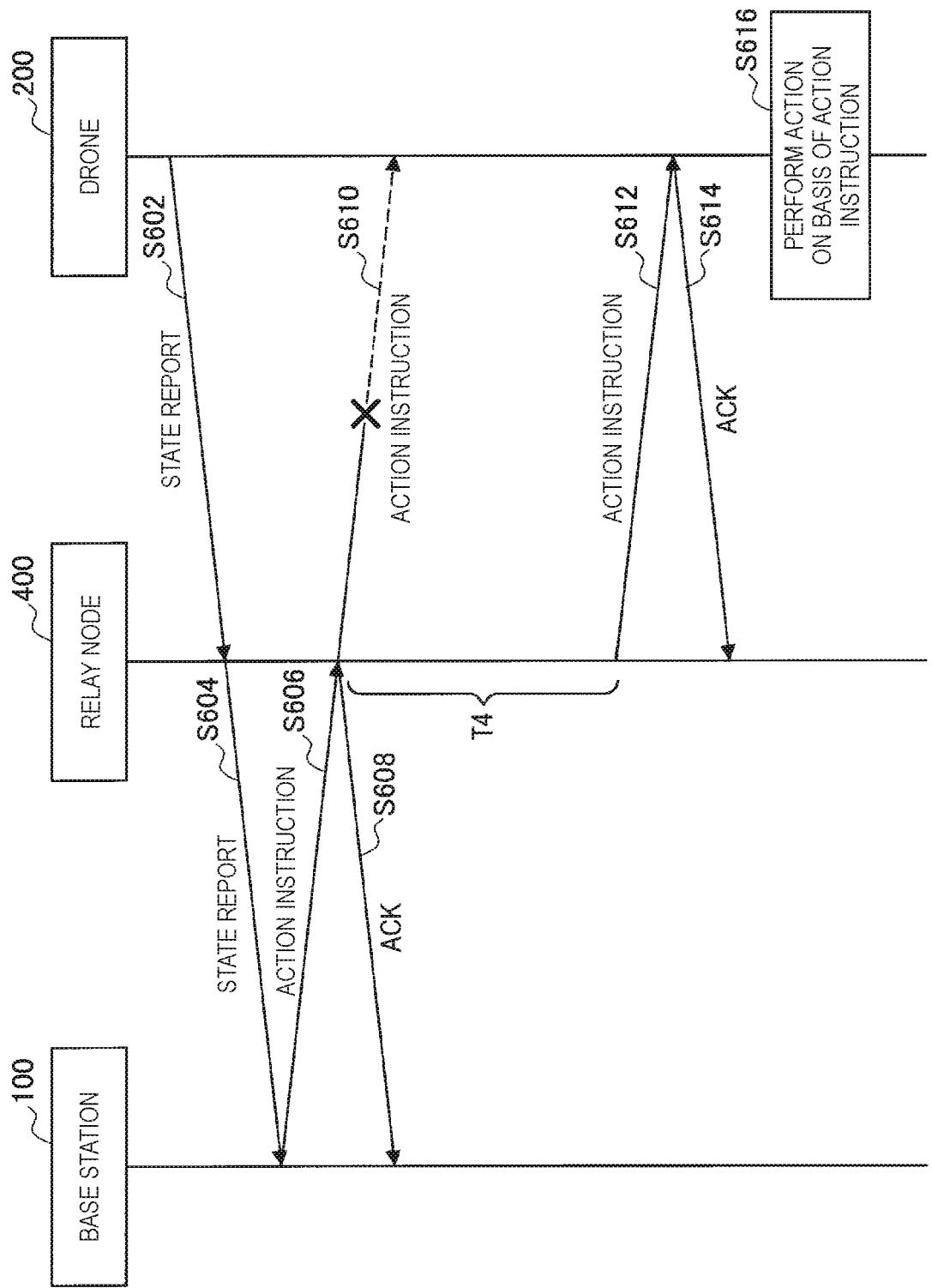
FIG. 14 is a sequence diagram illustrating an example of a flow of a retransmission control process performed in the system according to the present embodiment.

FIG. 14 is a sequence diagram illustrating an example of a flow of a retransmission control process performed in the system 1 according to the present embodiment. As illustrated in FIG. 14, the base station 100, the drone 200, and the relay node 400 are involved in the present sequence.

First, the drone 200 transmits a state report to the relay node 400 (step S602). Subsequently, the relay node 400 relays the state report received from the drone 200 to the base station 100 (step S604). Subsequently, the base station 100 decides an action of the drone 200 on the basis of the received state report and transmits an action instruction indicating a decision result to the relay node 400 (step S606). Subsequently, when the relay node 400 receives the action instruction, the relay node 400 responds to the base station 100 with ACK (step S608), relays the received action instruction to the drone 200 (step S610), and causes the timer with the length T4 to operate. In a case in which the timer expires before reception of ACK to the transmitted action instruction, the relay node 400 retransmits the action instruction to the drone 200 (step S612). Then, when the drone 200 receives the action instruction, the drone 200 responds to the relay node 400 with ACK (step S614) and performs the action based on the received action instruction (step S616).

Note that in consideration of the fact that the drone 200 which is a transmission source of the state report can continuously fly, it is considered that the drone 200 flies from the original place when the action instruction from the base station 100 is relayed by the relay node 400.

Accordingly, the relay node 400 may limit the number of times the action instruction is retransmitted to a predetermined number of times (for example, one). In a case in which ACK is not received even when the action instruction is retransmitted the predetermined number of times, the retransmission may be stopped.

3.4. Third Action Control Method

3.4.1. Overview

The third action control method can be adopted in an emergency situation. The emergency situation is, for example, a case in which a danger of crash occurs since a residual battery amount is considerably low or a wind speed is considerably fast. The drone 200 decides and performs a self-action autonomously in the emergency situation. Thus, in an emergency situation in which there is not a moment to be lost, an appropriate action can be performed early. Hereinafter, a flow of the third action control method will be described with reference to FIGS. 15 and 16.

Figure 15:
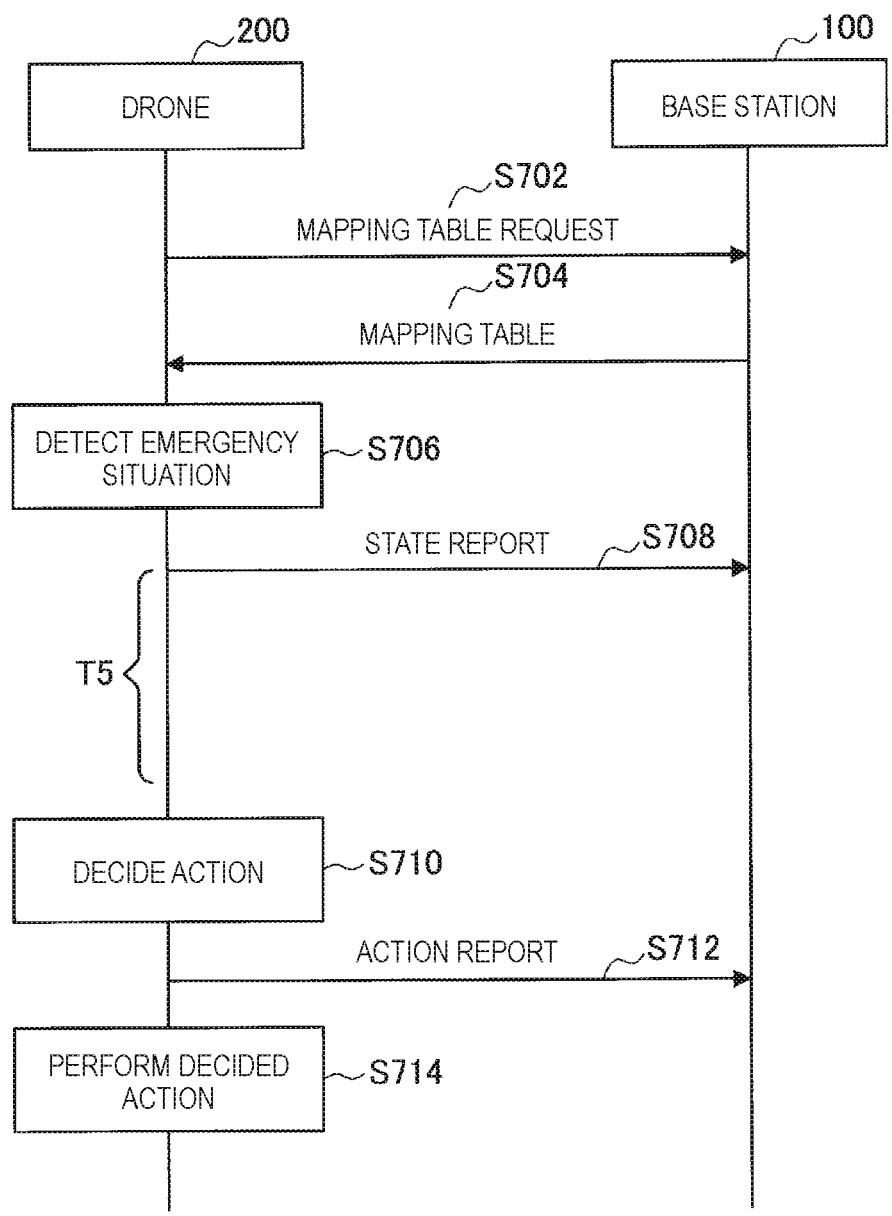
FIG. 15 is a sequence diagram illustrating an example of a flow of a third action control method performed in the system according to the present embodiment.

FIG. 15 is a sequence diagram illustrating an example of the flow of the third action control method performed in the system 1 according to the present embodiment. As illustrated in FIG. 15, the base station 100 and the drone 200 are involved in the present sequence.

First, the drone 200 transmits a mapping table request to the base station 100 (step S702). Subsequently, the base station 100 transmits a mapping table to the drone 200 (step S704). The drone 200 monitors a self-state and a peripheral environment in real time. In a case in which an emergency situation is detected (step S706), the drone 200 transmits a state report to the base station 100 (S708) and causes a timer with a length T5 to operate. In a case in which the timer expires before reception of an action instruction to the transmitted state report, the drone 200 decides a self-action on the basis of the mapping table (step S710). Subsequently, the drone 200 transmits an action report which is information indicating the decided self-action to the base station 100 (step S712). Then, the drone 200 performs the decided self-action (step S714).

Figure 16:
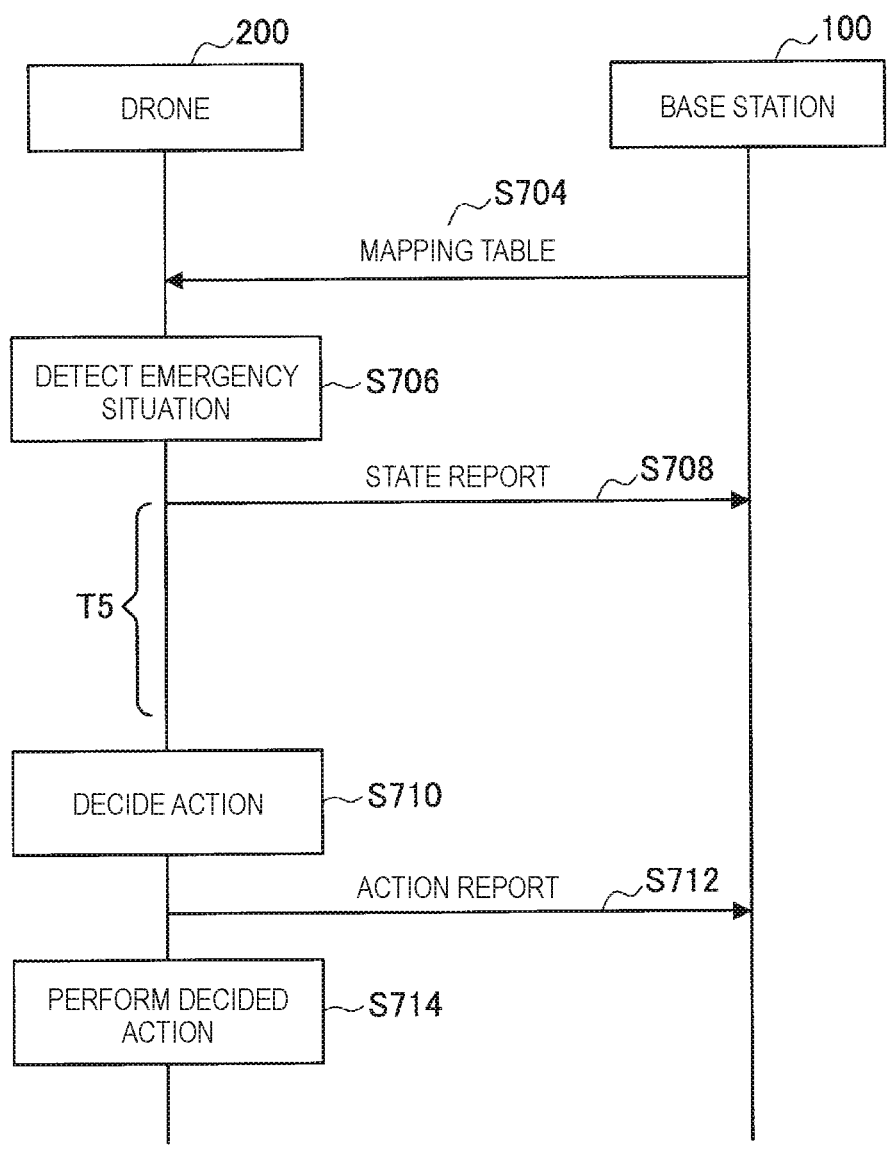
FIG. 16 is a sequence diagram illustrating an example of a flow of a third action control method performed in the system according to the present embodiment.

FIG. 16 is a sequence diagram illustrating an example of a flow of the third action control method performed in the system 1 according to the present embodiment. As illustrated in FIG. 16, in the present sequence, step S702 is omitted from the sequence illustrated in FIG. 15. That is, even when there is no request from the drone 200, the base station 100 may spontaneously transmit the mapping table to the drone 200.

3.4.2. Details (1) Mapping Table

Referring to the mapping table, the drone 200 makes a decision related to a self-action. Thus, the drone 200 can perform an appropriate action in an emergency situation.

The mapping table may be the same as or different from that used by the base station 100. Hereinafter, a specific example of the mapping table for an emergency situation will be described as one example.

The mapping table for an emergency situation includes N critical parameters. The critical parameter is a parameter which is monitored by the drone 200. In each of the N parameters, a threshold $\theta_i$ (where i=1, 2, ..., N) is set. The example is shown in Table 12. Hereinafter, the mapping table including the critical parameters is also referred to as a critical parameter table.

TABLE 12

Example of critical parameter table

| | Critical parameter | threshold |
|---|---|---|
| Self-state | Flight altitude | $\theta_1$ (m) |
| | Drone weight | $\theta_2$ (kg) |
| | Drone size | $\theta_3$ (dm*dm*dm) |
| | Flight speed | $\theta_4$ (m/s) |
| | Tilt angle | $\theta_5$ (rad) |
| | Acceleration | $\theta_6$ (m/s$^2$) |
| | Rotational speed | $\theta_7$ (rad/s) |
| | Rotational speed of propeller | $\theta_8$ (rad/s) |
| | Internal processor temperature | $\theta_9$ (K) |
| | Residual battery amount | $\theta_{10}$ (%) |
| | Battery temperature | $\theta_{11}$ (K) |
| | ... | ... |
| Peripheral environment | Environment temperature | $\theta_{12}$ (K) |
| | Atmospheric pressure | $\theta_{13}$ (kPa) |
| | Relative temperature | $\theta_{14}$ (%) |
| | Rainfall | $\theta_{15}$ (mm) |
| | Visibility | $\theta_{16}$ (m) |
| | Illumination | $\theta_{17}$ (lux) |
| | Electric field strength | $\theta_{18}$ (N/C) |
| | Next-time strength | $\theta_{19}$ (A/m) |
| | Wind speed | $\theta_{20}$ (m/s) |
| | Wind direction | $\theta_{21}$ (rad) |
| | ... | ... |

The drone 200 determines an emergency situation on the basis of a comparison result between a threshold and a sensing result of the critical parameter. For example, the drone 200 determines an emergency situation in a case in which the number of critical parameters satisfying conditions greater or less than the thresholds, or the like exceeds k, and determines a normal state (that, safety) in other cases. Here, in a case in which a specific critical parameter such as a residual battery amount or a wind speed is greater or less than the threshold, an emergency situation may be determined even when k conditions are not satisfied. This critical parameter can also be referred to as a key critical parameter.

The critical parameter table may be unicast to the drone 200, for example, at a timing at which the drone 200 is newly connected to a network. In addition, the critical parameter table may be multicast to a group of the drones 200, for example, at a timing at which the group is newly connected to the network.

The base station 100 may transmits the critical parameter table in response to a request, as illustrated in FIG. 15 or may be transmitted regardless of a request, as illustrated in FIG. 16. In the latter case, for example, the base station 100 can periodically broadcast the critical parameter table.

(2) Timer

When the drone 200 transmits a state report, the drone 200 causes the timer with the length T5 to operate and decides a self-action autonomously in a case in which the timer expires before reception of an action instruction to the transmitted state report. The drone 200 may set the length T5 of the timer to 0. This is because it is desirable to make a decision without delay of a moment in an emergency situation.

(3) Decision-Making

The drone 200 decides a self-action on the basis of the mapping table. Specifically, in a case in which an emergency situation is determined referring to the critical parameter table, the drone 200 decides to perform emergency landing. The emergency landing has been described above. The drone 200 stops actions which are not related to the landing after the transmission of the action report and starts an emergency landing process. Of course, the drone 200 may decide any action such as continuous flight, an operation of a new function such as photographing, or a change in flight parameters (for example, a flight speed and the like).

(4) Action Report

The drone 200 transmits an action report which is information indicating the decided self-action to the base station 100. Thus, the base station 100 can ascertain an action of the drone 200. Of course, the base station 100 can also decide an action of the drone 200 on the basis of a newly received state report, that is, overwrites the action.

A state report may be transmitted along with the action report. The state report may include content of a state report for which there is no response to a corresponding action instruction. That is, the state report transmitted in step S712 of the sequence illustrated in FIG. 15 may include content of the state report transmitted in step S708.

3.4.3. Specific Example

Hereinafter, a specific example of the third action control method according to the present embodiment will be described. A specific example of the critical parameter table is shown in Table 13 below. The critical parameter table illustrated in Table 13 below is assumed to be transmitted to the drones 200A, 200B, 200C, and 200D.

TABLE 13

| Example of critical parameter table | | |
|---|---|---|
| | Critical parameter | threshold |
| Self-state | Flight speed (m) | 80 |
| | Drone weight (kg) | 3 |
| | Flight speed (m/s) | 20 |
| | Residual battery amount | 10% |

TABLE 13-continued

| Example of critical parameter table | | |
|---|---|---|
| | Critical parameter | threshold |
| Peripheral environment | Atmospheric pressure (kPa) | 100 |
| | Relative temperature | 50% |
| | Wind speed (m/s) | 15 |

Each of the drones 200A, 200B, 200C, and 200D monitors the parameters shown in Table 13 above in real time. Key critical parameters are a residual battery amount and a wind speed. In a case in which the residual battery amount is less than 10% or a wind speed is greater than 15 m/s, each of the drones 200A, 200B, 200C, and 200D determines an emergency situation. Note that the threshold k which is a condition number is assumed to be 2. Table 14 below shows specific examples of the critical parameters of the drones 200A, 200B, 200C, and 200D.

TABLE 14

| Examples of critical parameters | | | | |
|---|---|---|---|---|
| | Drone 200A | Drone 200B | Drone 200C | Drone 200D |
| Flight speed (m) | 50 | 50 | 50 | 50 |
| Drone weight (kg) | 2 | 2 | 10 | 10 |
| Flight speed (m/s) | 10 | 10 | 30 | 10 |
| Residual battery amount | 5% | 50% | 50% | 50% |
| Atmospheric pressure (kPa) | 200 | 200 | 200 | 200 |
| Relative humidity | 40% | 40% | 70% | 40% |
| Wind speed (m/s) | 0 | 25 | 2 | 2 |

The drone 200A determines an emergency situation since the residual battery amount is 5% which is less than a threshold of 10%. The drone 200B determines an emergency situation since a wind speed is 25 m/s which is greater than a threshold of 10 m/s. The drone 200C determines an emergency situation since a weight is 10 kg greater than a threshold of 3 kg, a flight speed is 30 m/s greater than a threshold of 10 m/s, relative humidity is 70% which is greater than a threshold of 50%, and the number of critical parameters satisfying the conditions is 3 greater than a threshold of 2. The drone 200D determines a normal state since a weight is 10 kg greater than the threshold of 3 kg and the number of critical parameters satisfying the conditions is 1 less than the threshold of 2. Therefore, the drones 200A, 200B, and 200C perform the emergency landing and the drone 200D continues the flight.

3.5. Crash Map

Figure 17:
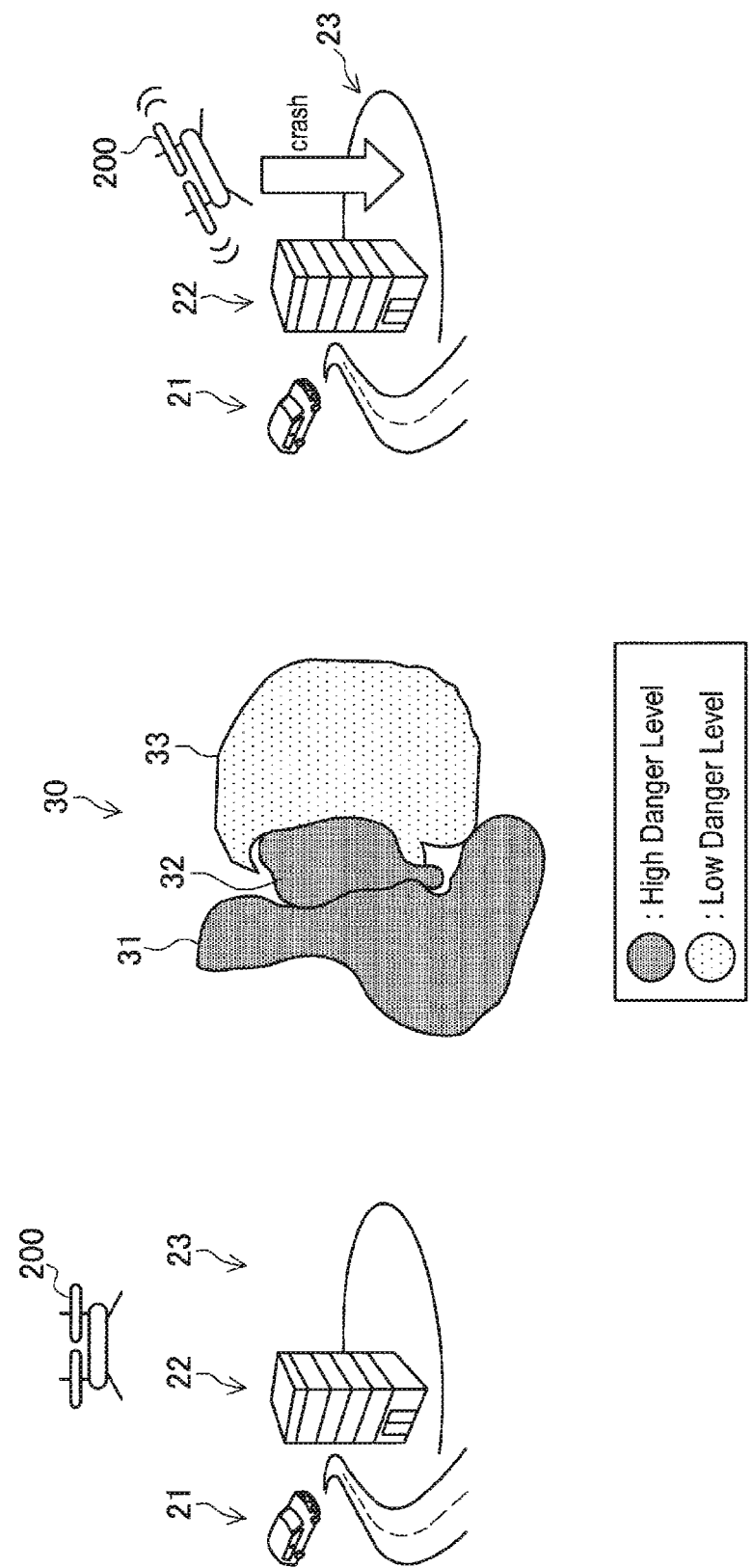
FIG. 17 is an explanatory diagram illustrating a crash map according to the present embodiment.
Figure 18:
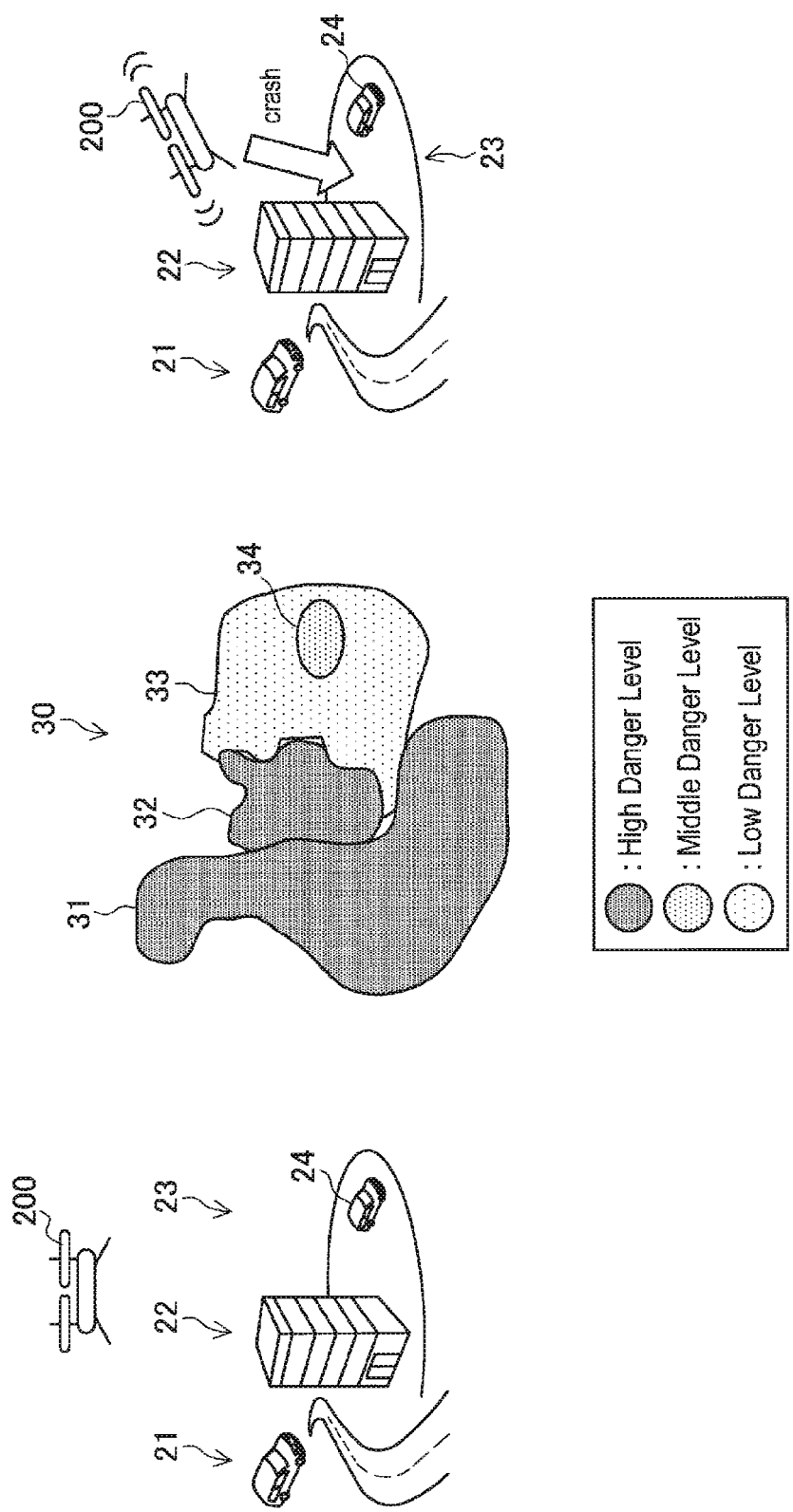
FIG. 18 is an explanatory diagram illustrating a crash map according to the present embodiment.
Figure 19:
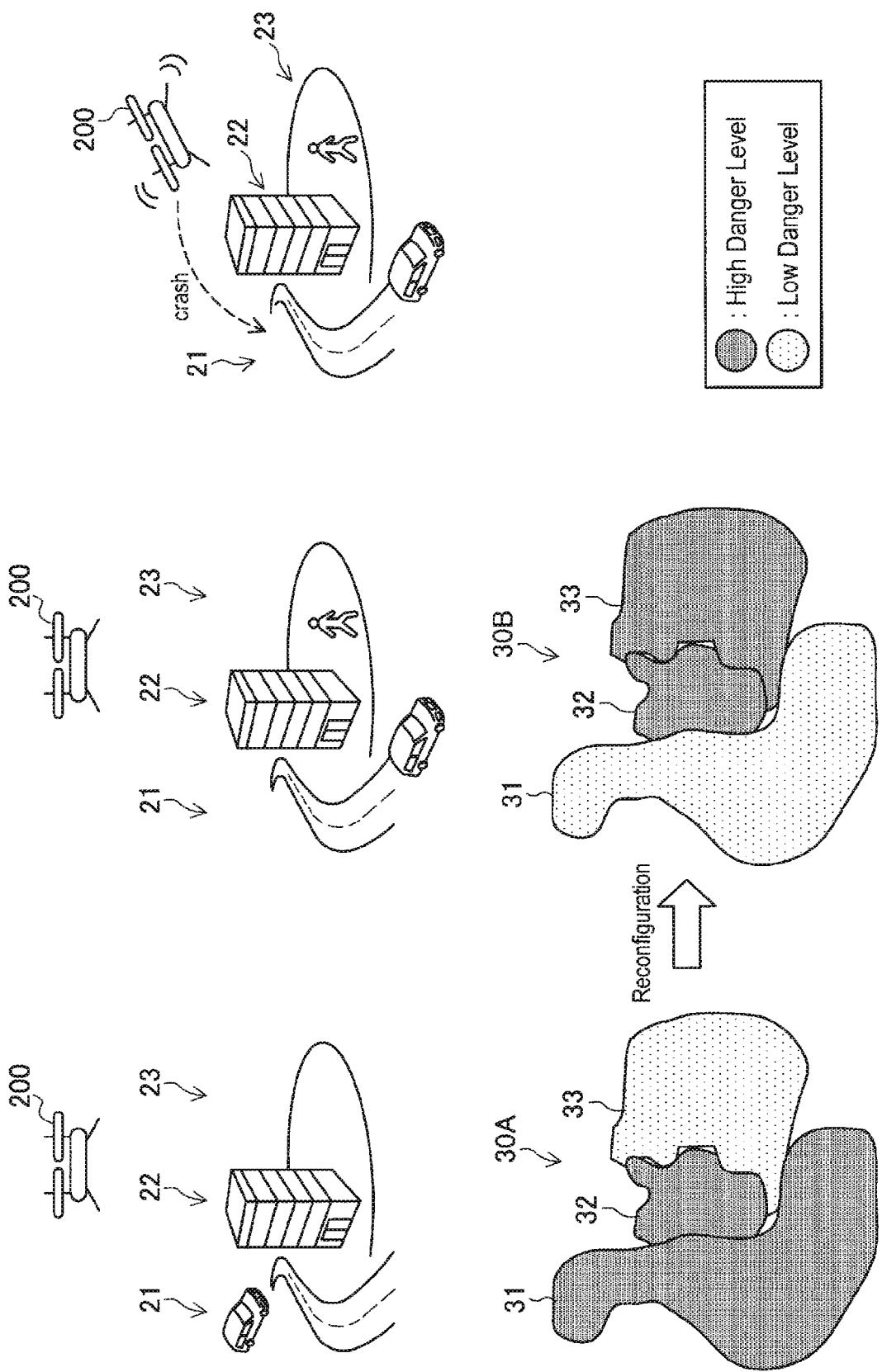
FIG. 19 is an explanatory diagram illustrating a crash map according to the present embodiment.

Hereinafter, crash maps will be described in detail with reference to FIGS. 17 to 19. FIGS. 17 to 19 are explanatory diagrams illustrating crash maps according to the present embodiment.

As illustrated in the left drawing of FIG. 17, a case in which the drone 200 performs emergency landing when the drone 200 is flying in the sky above a road 21, a building 22, and an open space 23 is assumed. In this case, referring to a crash map 30 illustrated in the middle drawing of FIG. 17, the drone 200 performs the emergency landing. In the crash map 30, an area 31 corresponding to the road 21 and an area 32 corresponding to the building 22 are areas in which a danger level is high, and an area 33 corresponding to the open place 23 is a safe area in which a danger level is low. Accordingly, as illustrated in the right drawing of FIG. 17, the drone 200 performs the emergency landing in the open place 23 corresponding to the safe area 33.

In the example illustrated in FIG. 17, two kinds of danger levels are defined. Three or more kinds of danger levels may be defined. This point will be described with reference to FIG. 18.

As illustrated in the left drawing of FIG. 18, a case in which the drone 200 performs emergency landing when the drone 200 is flying in the sky above the road 21, the building 22, and the open place 23 is assumed. Here, a car 24 is parked in the open place 23. In this case, referring to the crash map 30 illustrated in the middle drawing of FIG. 18, the drone 200 performs the emergency landing. In the crash map 30, the area 31 corresponding to the road 21 and the area 32 corresponding to the building 22 are areas in which the danger level is high, an area 34 corresponding to the car 24 parked in the open place 23 is an area in which a danger level is intermediate, and the area 33 corresponding to the other parts of the open place 23 is a safe area in which a danger level is low. Accordingly, as illustrated in the right drawing of FIG. 18, the drone 200 performs the emergency landing in an area in which the car 24 in the open place 23 corresponding to the safe area 33 is not parked.

Each of the base station 100 and the drone 200 can update the crash map. In general, the crash map is updated using a change in an environment as a trigger. This point will be described with reference to FIG. 19.

As illustrated in the upper left drawing of FIG. 19, a case in which the drone 200 performs emergency landing when the drone 200 is flying in the sky above the road 21, the building 22, and the open place 23 is assumed. As illustrated in the lower left drawing of FIG. 19, a crash map 30A in this case is similar to the crash map 30 described with reference to FIG. 17. Under this situation, as illustrated in the upper middle drawing of FIG. 10, it is assumed that a car is running from the road 21 and a person is entering the open place 23. Then, as illustrated in the lower middle drawing of FIG. 10, the drone 200 updates the crash map 30A to a crash map 30B. In the crash map 30B, the area 31 corresponding to the road 21 in which the running car temporarily disappears is a safe area in which a danger level is low, and the area 32 corresponding to the building 22 and the area 33 corresponding to the open place 23 which the person is entering are areas in which a danger level is high. Accordingly, as illustrated in the right drawing of FIG. 19, the drone 200 performs emergency landing in the road 21 corresponding to the safe area 31.

3.6. Drone Category (1) Background

In 3GPP, a plurality of UE categories is defined so that an eNB enables efficient communication with all the UEs connected to the eNB. In current LTE, capabilities related to uplink and downlink wireless throughputs are defined in UE categories. An example of the defined capability includes the maximum number of downlink/uplink-shared channel (DL/UL-SCH) transport block bits transmitted and received at the transmission time interval (TTI).

However, in the UE categories, parameters related to flight are not considered. In the case of a drone, parameters such as a flight altitude related to flight can have a nonnegligible influence on communication between the drone and another node such as an eNB. For example, an influence on uplink and downlink peak speeds, a maximum frequency bandwidth, and the like can occur. In a case in which a drone uses the existing UE categories, many troubles related to communication can occur.

Accordingly, it is desirable to define categories in which parameters particularly related to flight are considered.

(2) Drone Category

In the system 1 according to the present embodiment, a drone category is defined as a category in which parameters related to flight are considered. In the drone category, parameters such as a flight altitude related to flight is defined in addition to the existing parameters for defining the UE category. That is, in the drone category, parameters related to communication with the base station 100 and parameters related to flight of the drone 200 are defined.

The drone category is defined by the base station 100 or a network. At this time, a drone category table including definition of one or more drone categories is configured. The base station 100 or a control node transmits the drone category table to the drone 200 and the drone 200 responds with ACK. Referring to the received drone category table, the drone 200 can specify a self-drone category. Then, the drone 200 reports the self-drone category to the base station 100. Thus, the base station 100 can realize efficient communication in which the flight of the drone 200 is considered.

When the drone 200 transmits, for example, a request for the mapping table, the drone 200 can make a request to transmit the drone category table in order to know the self-drone category. On the other hand, even in a case in which the drone 200 transmits a request for the mapping table without transmitting a request for the drone category, the base station 100 may transmit the drone category table.

In addition, the mapping table for decision-making related to the drone 200 can differ depending on the drone category of the drone 200. That is, referring to the mapping table in accordance with the drone category of the drone 200, the base station 100 can decide an action of the drone 200.

An example of the drone category table is shown in Table 15 below. In the drone category, parameters such as a size, a weight, and a maximum flight altitude related to flight are defined as parameters which are not in the UE categories. In future, the drone category can be extended including any flight vehicle such as an airplane or a satellite other than the drone as a target.

TABLE 15

Example of drone category

| Drone category | Category-1 | Category-2 | ... |
|---|---|---|---|
| Peak speed (downlink) (mbps) | DL_bitrate1 | DL_bitrat2 | ... |
| Peak speed (uplink) (mbps) | UL_bitrate1 | UL_bitrat2 | ... |
| Max frequency bandwidth (MHz) | BW1 | BW2 | ... |
| Max modulation order (downlink) | DL_modu_order1 | DL_modu_order2 | ... |
| Max modulation order (uplink) | U_modu_order1 | UL_modu_order2 | ... |
| Max MIMO pattern (downlink) | DL_pattern1 | DL_pattern2 | ... |
| Max MIMO pattern (uplink) | UL_pattern1 | UL_pattern2 | ... |
| Max flying height (m) | h1 | h2 | ... |
| Max flying speed (m/s) | v1 | v2 | ... |
| Max flying dip angle (rad) | α 1 | α 2 | ... |

TABLE 15-continued

Example of drone category

| Drone category | Category-1 | Category-2 | ... |
|---|---|---|---|
| Max load (g) | m1 | m2 | ... |
| Max flying distance (km) | d1 | d2 | ... |
| Max flying distance RTD (km) | d1_RTD | d2_RTD | ... |
| Max flying time (min) | t1 | t2 | ... |
| Max flying time RTD (min) | t1_RTD | t2_RTD | ... |
| ... | ... | ... | ... |

Note that return to departure (RTD) means return to a takeoff place. For example, a distance or a time up to a takeoff place is defined in Table 15 above. In a case in which it is necessary for the drone 200 to return to a takeoff place, it is preferable to define a parameter related to RTD.

Table 16 below shows three specific examples of the drone category.

TABLE 16

Example of drone category

| Drone category | Category-1 | Category-2 | Category-3 |
|---|---|---|---|
| Peak speed (downlink) (mbps) | 150 | 300 | 300 |
| Peak speed (uplink) (mbps) | 50 | 75 | 50 |
| Max frequency bandwidth (MHz) | 20 | 20 | 40 |
| Max modulation order (downlink) | 64QAM | 64QAM | 64QAM |
| Max modulation order (uplink) | 16QAM | 64QAM | 16QAM |
| Max MIMO pattern (downlink) | 2 | 4 | 2/4 |
| Max MIMO pattern (uplink) | 2 | 2 | 2 |
| Max flying height (m) | 50 | 50 | 100 |
| Max flying speed (m/s) | 20 | 20 | 20 |
| Max load (g) | 5 | 8 | 5 |
| Max flying distance (km) | 10 | 20 | 20 |
| Max flying distance RTD (km) | 5 | 10 | 10 |
| Max flying time (min) | 40 | 60 | 40 |
| Max flying time RTD (min) | 20 | 30 | 20 |

4. Application Examples

The technology according to the present disclosure can be applied to various products. For example, the base station 100 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station 100 may be realized as another type of base station such as a NodeB or a base transceiver station (BTS). The base station 100 may include a main entity (also referred to as a base station device) that controls wireless communication and one or more remote radio heads (RRHs) disposed at different locations from the main entity. Further, various types of terminals to be described below may operate as the base station 100 by performing a base station function temporarily or semi-permanently.

First Application Example

Figure 20:
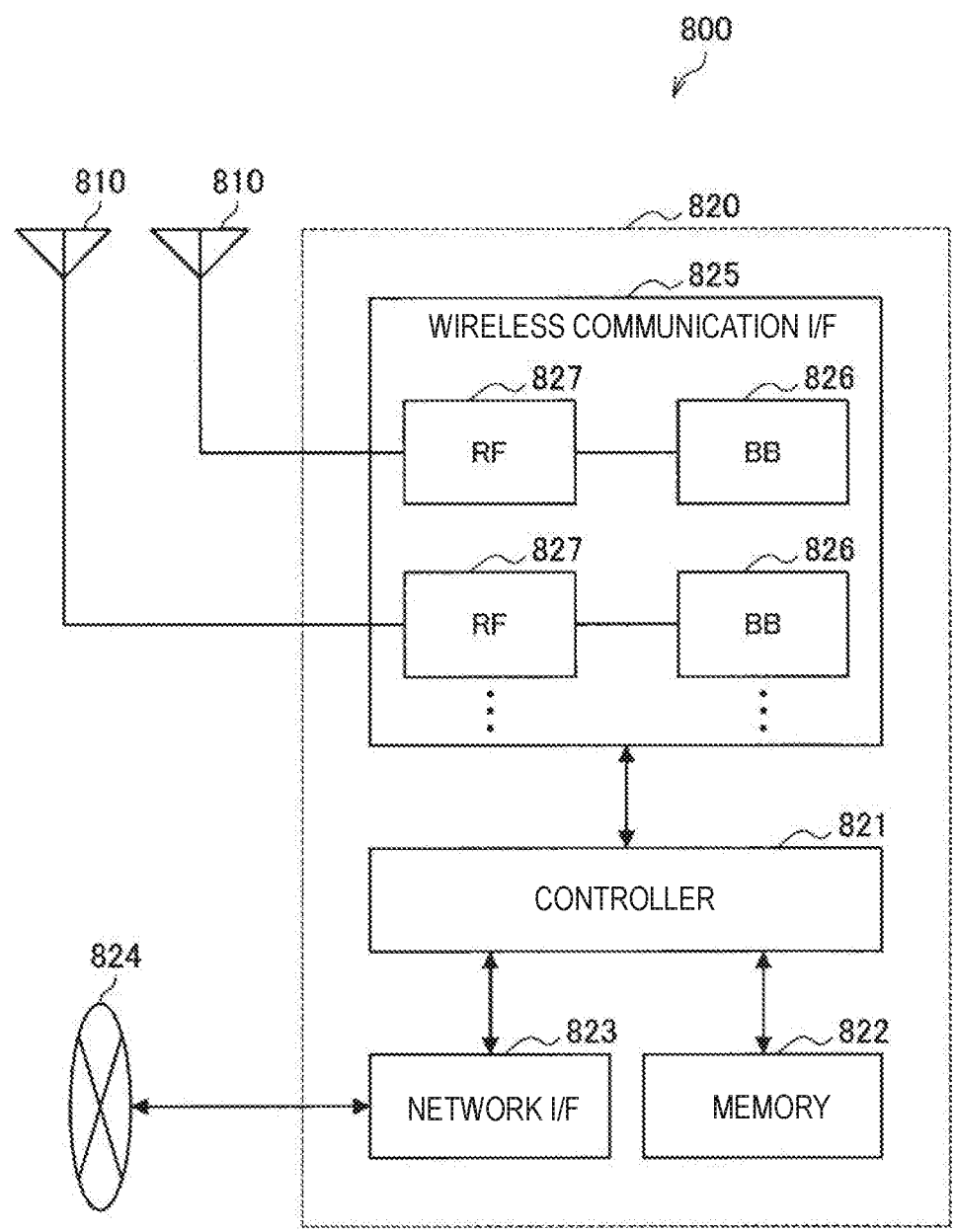
FIG. 20 is a block diagram illustrating a first example of a schematic configuration of an eNB.

FIG. 20 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 20, and the plurality of antennas 810 may, for example, correspond to a plurality of frequency bands used by the eNB 800. It should be noted that while FIG. 20 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 20, and the plurality of BB processors 826 may, for example, correspond to a plurality of frequency bands used by the eNB 800. Further, the wireless communication interface 825 may also include a plurality of the RF circuits 827, as illustrated in FIG. 20, and the plurality of RF circuits 827 may, for example, correspond to a plurality of antenna elements. Note that FIG. 20 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 20, one or more constituent elements (the acquisition unit 151 and/or the remote control unit 153) included in the processing unit 150 described with reference to FIG. 2 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 20, the wireless communication unit 120 described with reference to FIG. 2 may be implemented in the wireless communication interface 825 (for example, the RF circuit 827). Further, the antenna unit 110 may be implemented at the antenna 810. Further, the network communication unit 130 may be implemented at the controller 821 and/or the network interface 823. Further, the storage unit 140 may be implemented at the memory 822.

Second Application Example

Figure 21:
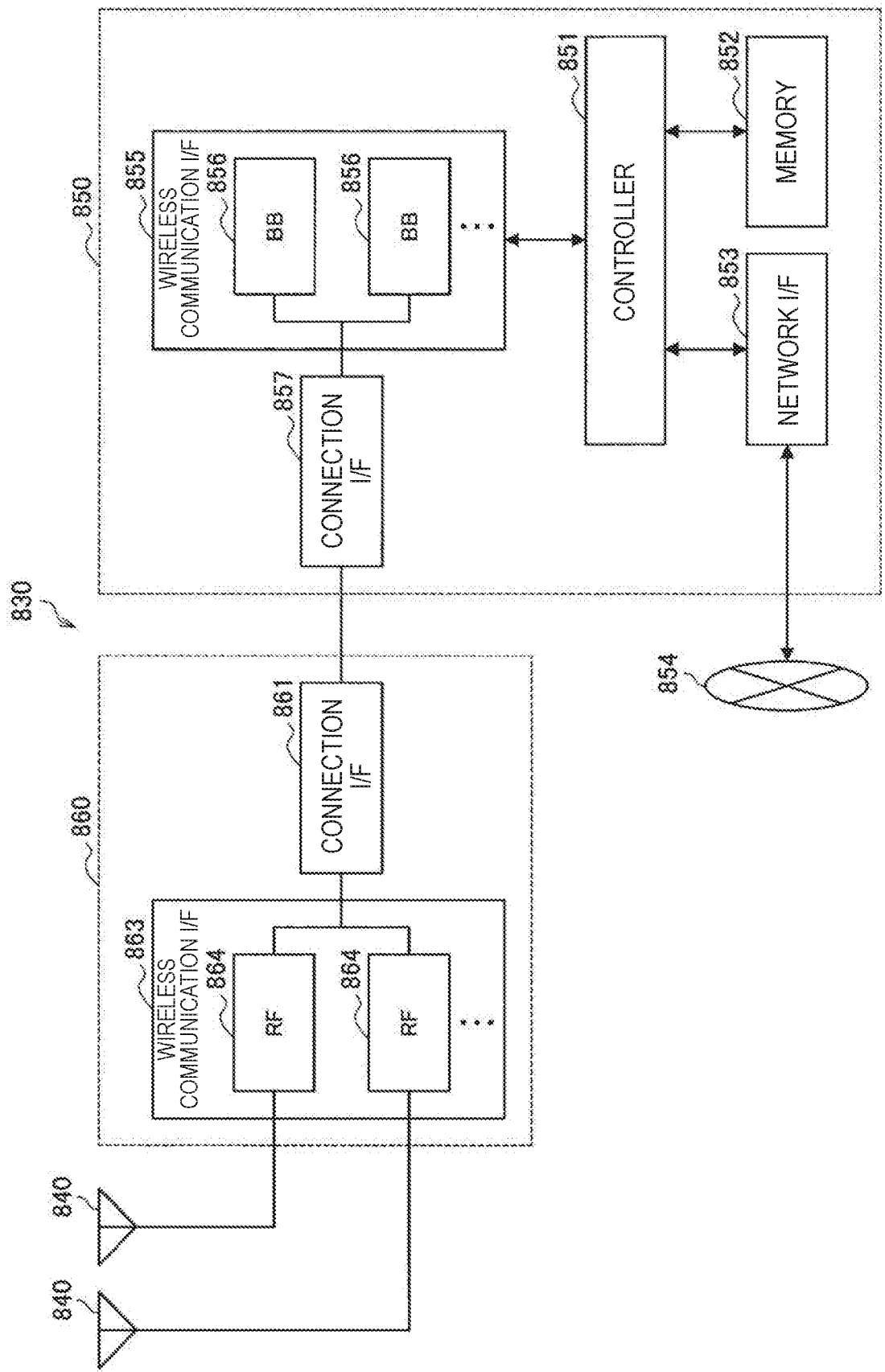
FIG. 21 is a block diagram illustrating a second example of the schematic configuration of the eNB.

FIG. 21 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 21, and the plurality of antennas 840 may, for example, correspond to a plurality of frequency bands used by the eNB 830. Note that FIG. 21 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 20.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 20 except that the BB processor 856 is connected to an RF circuit 864 of the RRH 860 via the connection interface 857. The wireless communication interface 855 may include a plurality of the BB processors 856, as illustrated in FIG. 21, and the plurality of BB processors 856 may, for example, correspond to a plurality of frequency bands used by the eNB 830. Note that FIG. 21 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 21, and the plurality of RF circuits 864 may, for example, correspond to a plurality of antenna elements. Note that FIG. 21 illustrates an example in which the wireless communication interface 863 includes the plurality of RF circuits 864, but the wireless communication interface 863 may include the single RF circuit 864.

In the eNB 830 illustrated in FIG. 21, one or more constituent elements (the acquisition unit 151 and/or the remote control unit 153) included in the processing unit 150 described with reference to FIG. 2 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 825 and/or the controller 851 may be implemented on the eNB 830. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 21, for example, the wireless communication unit 120 described with reference to FIG. 2 may be implemented in the wireless communication interface 863 (for example, the RF circuit 864). Further, the antenna unit 110 may be implemented at the antenna 840. Further, the network communication unit 130 may be implemented at the controller 851 and/or the network interface 853. Further, the storage unit 140 may be implemented at the memory 852.

5. Conclusion

The embodiment of the present disclosure has been described in detail above with reference to FIGS. 1 to 21. As described above, the drone 200 reports the action-allowable time information regarding the action-allowable time to the base station 100 and acts on the basis of an action instruction decided on the basis of the reported action-allowable time information and notified of by the base station 100. The base station 100 efficiently monitors a state (including a peripheral environment) of the drone 200 in accordance with the report from the drone 200. Then, the base station 100 instructs the drone 200 to perform an action for preventing the drone 200 from crashing or suppressing harm to be as little as possible in the case of a crash. Thus, it is possible to improve safety of the drone 200.

In addition, the base station 100 notifies the drone 200 of the crash map in which a danger level for each peripheral place is defined and which is used in an emergency situation. Then, the drone 200 acts referring to the map in which the danger level for each peripheral place is defined in the emergency situation. Thus, the drone 200 can perform emergency landing in a place in which harm is minimized in the case of landing in the emergency situation.

In addition, the drone 200 can monitor a self-state and make a decision autonomously. In this case, the drone 200 can reduce overhead of communication and delay of an action in the emergency situation compared to a method of transmitting a state report to the base station 100 and receiving an action instruction. Thus, it is possible to further improve the safety of the drone 200 in an emergency situation.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the drone 200 is not limited to a drone in a narrow sense. For example, the drone 200 may be an arbitrary flight vehicle controlled via cellular communication. In addition, the present technology can also be applied to devices such as cleaning robots and pet robots that autonomously move, as well as flight vehicles.

Further, the processing described using the sequence diagrams in the present specification does not necessarily have to be executed in the illustrated order. Some processing steps may be executed in parallel. Further, additional processing steps may be employed, or part of the processing steps may be skipped.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A circuit including:

a report unit configured to report action-allowable time information regarding an action-allowable time to a base station; and an action control unit configured to control an action of a moving object on the basis of an action instruction decided on the basis of the reported action-allowable time information and notified of by the base station and to control an action with reference to a map in which a danger level for each place is defined in an emergency situation.

(2)

The circuit according to (1), in which the map is a map in which a danger level assumed in a case of landing in each place is defined.

(3)

The circuit according to (1) or (2), in which the map can be updated dynamically.

(4)

The circuit according to any one of (1) to (3), in which the action-allowable time information includes information regarding a state of the moving object which is a control target or a peripheral environment.

(5)

The circuit according to (4), in which the action-allowable time information includes battery information.

(6)

The circuit according to (5), in which the battery information includes at least one of information indicating a residual battery amount, information indicating a maximum battery capacity, or information indicating power consumption.

(7)

The circuit according to any one of (4) to (6), in which the action-allowable time information is expressed with an absolute value or a relative value and precision is higher as the action-allowable time is shorter.

(8)

The circuit according to any one of (4) to (7), in which the action-allowable time information includes at least one of a size, a weight, a material, a shape, a flight altitude, a flight speed, flight acceleration, a flight direction, or a current action of the moving object which is the control target.

(9)

The circuit according to any one of (4) to (8), wherein the action-allowable time information includes at least one of temperature, an atmospheric pressure, rainfall, a wind speed, or a wind direction.

(10)

The circuit according to any one of (1) to (9), wherein the report unit switches a report method depending on whether the moving object which is the control target is located within a coverage of the base station or outside of the coverage.

(11)

The circuit according to (10), wherein the report unit performs direct reporting in a case in which the moving object which is the control target is located within the coverage of the base station.

(12)

The circuit according to (10) or (11), wherein the report unit performs indirect reporting via a relay node in a case in which the moving object which is the control target is located outside of the coverage of the base station.

(13)

The circuit according to (12), wherein the relay node is selected from a plurality of the moving objects outside of the coverage.

(14)

The circuit according to (13), wherein the relay node is selected in sequence alternately or on the basis of a predetermined standard.

(15)

The circuit according to (13) or (14), in which, in a case in which the moving object which is a control target is selected as a relay node, the action control unit collects a state report from another moving object outside of coverage, causes the moving object which is the control target to move into the coverage, and performs reporting to the base station.

(16)

The circuit according to any one of (1) to (15), in which, in a case in which the action-allowable time is less than a predetermined threshold, the action control unit requests supply of power to another moving object or a power supply station or controls the moving object which is a control target such that the moving object moves to the power supply station.

(17)

The circuit according to any one of (1) to (16), in which decision of an action based on the action-allowable time information is performed with reference to a mapping table in which a combination of a condition related to the action-allowable time information and an action to be decided in a case in which the condition is satisfied is defined.

(18)

The circuit according to (17), in which the mapping table is set in advance by the base station or a network.

(19)

The circuit according to (17) or (18), in which an action defined in the mapping table at least includes an action in a maintaining mode and an action in a landing mode.

(20)

The circuit according to (19), in which the maintaining mode includes an all-maintaining mode in which all current actions continue and a power-saving mode in which some of the current actions continue.

(21)

The circuit according to (19) or (20), in which the landing mode includes a preparative landing mode including predetermined landing preparation and an emergency landing mode not including the predetermined landing preparation.

(22)

The circuit according to any one of (1) to (21), wherein the report unit reports a category of the moving object which is the control target.

(23)

The circuit according to (22), wherein the category defines a parameter related to communication with the base station and a parameter related to flight of the moving object which is the control target.

(24)

A base station including:

an acquisition unit configured to acquire action-allowable time information regarding an action-allowable time of a terminal device; and a control unit configured to decide an action of the terminal device on the basis of the action-allowable time information and notify the terminal device of an action instruction, and notify the terminal device of a map in which a danger level for each place is defined and which is used in an emergency situation.

(25)

A method performed by a processor, the method including:

reporting action-allowable time information regarding an action-allowable time to a base station; and controlling an action of a moving object on the basis of an action instruction decided on the basis of the reported action-allowable time information and notified of by the base station and controlling an action with reference to a map in which a danger level for each place is defined in an emergency situation.

(26)

A method performed by a processor, the method including:

acquiring action-allowable time information regarding an action-allowable time of a terminal device; and deciding an action of the terminal device on the basis of the action-allowable time information and notifying the terminal device of an action instruction, and notifying the terminal device of a map in which a danger level for each place is defined and which is used in an emergency situation.

(27)

A recording medium having a program recorded therein causing a computer to function as:

a report unit configured to report action-allowable time information regarding an action-allowable time to a base station; and an action control unit configured to control an action of a moving object on the basis of an action instruction decided on the basis of the reported action-allowable time information and notified of by the base station and to control an action with reference to a map in which a danger level for each place is defined in an emergency situation.

(28)

A recording medium having a program recorded therein causing a computer to function as:

an acquisition unit configured to acquire action-allowable time information regarding an action-allowable time of a terminal device; and a control unit configured to decide an action of the terminal device on the basis of the action-allowable time information and notify the terminal device of an action instruction, and notify the terminal device of a map in which a danger level for each place is defined and which is used in an emergency situation.

REFERENCE SIGNS LIST 1 system
11 cell
100 base station
110 antenna unit
120 wireless communication unit
130 network communication unit
140 storage unit
150 processing unit
151 acquisition unit
153 remote control unit
200 terminal device, drone
210 antenna unit
220 wireless communication unit
230 storage unit
240 flight device
241 driving unit
242 battery unit
243 sensor unit
244 flight control unit
250 processing unit
251 report unit
253 action control unit
300 terminal device
400 relay node

The invention claimed is:

1. A circuit, comprising:
circuitry configured to:
receive a report request from a base station;
transmit, based on the received report request, action-allowable time information regarding an action-allowable time to the base station;
receive an action instruction from the base station based on the transmitted action-allowable time information;
receive, from the base station, a map in which a danger level for each place is defined; and
control an action of a first moving object in an emergency situation, based on the action instruction and the map in which the danger level for each place is defined.

2. The circuit according to claim 1, wherein the danger level is defined in the map in a case the first moving object lands on each place.

3. The circuit according to claim 1, wherein the circuitry is further configured to dynamically update the map.

4. The circuit according to claim 1, wherein the action-allowable time information includes at least one of peripheral environment information or information regarding a state of the first moving object which is a control target.

5. The circuit according to claim 4, wherein the action-allowable time information further includes battery information.

6. The circuit according to claim 5, wherein the battery information includes at least one of information indicating a residual battery amount, information indicating a maximum battery capacity, or information indicating power consumption.

7. The circuit according to claim 4, wherein the action-allowable time information is expressed with an absolute value or a relative value and precision is higher as the action-allowable time is shorter.

8. The circuit according to claim 4, wherein the action-allowable time information further includes at least one of a size, a weight, a material, a shape, a flight altitude, a flight speed, flight acceleration, a flight direction, or a current action of the first moving object which is the control target.

9. The circuit according to claim 1, wherein, in a case in which the first moving object is a relay node, the circuitry is further configured to:
receive a state report from a second moving object that is outside of coverage of the base station;
control the first moving object which is a control target to move into the coverage of the base station; and
transmit the state report to the base station.

10. The circuit according to claim 1, wherein, in a case in which the action-allowable time is less than a specific threshold, the circuitry is further configured to at least one of:
request supply of power to one of a second moving object or a power supply station; or
control the first moving object to move to the power supply station.

11. The circuit according to claim 1, wherein the action instruction is based on a mapping table in which a combination of a condition related to the action-allowable time information and the action in a case in which the condition is satisfied is defined.

12. The circuit according to claim 11, wherein the mapping table is set in advance by one of the base station or a network.

13. The circuit according to claim 11, wherein the action defined in the mapping table includes an action in a maintaining mode and an action in a landing mode.

14. The circuit according to claim 13, wherein the maintaining mode includes an all-maintaining mode in which all current actions continue and a power-saving mode in which some of the current actions continue.

15. The circuit according to claim 13, wherein the landing mode includes a preparative landing mode including a specific landing preparation and an emergency landing mode not including the specific landing preparation.

16. A base station, comprising:
circuitry unit configured to:
transmit a report request to a terminal device;
acquire, based on the transmitted report request, action-allowable time information regarding an action-allowable time of the terminal device;
determine an action of the terminal device based on of the action-allowable time information;
notify the terminal device of an action instruction based on the determined action; and
notify the terminal device of a map in which a danger level for each place is defined, wherein the terminal device executes the action in an emergency situation based on the action instruction and the map.

17. A method performed by a processor, the method comprising:
    receiving a report request from a base station;
    transmitting, based on the received report request, action-allowable time information regarding an action-allowable time to the base station;
    receiving an action instruction from the base station based on the transmitted action-allowable time information;
    receiving, from the base station, a map in which a danger level for each place is defined; and
    controlling an action of a moving object in an emergency situation, based on the action instruction and the map in which the danger level for each place is defined.

18. A method performed by a processor, the method comprising:
    transmitting a report request to a terminal device;
    acquiring, based on the transmitted report request, action-allowable time information regarding an action-allowable time of the terminal device;
    determining an action of the terminal device based on the action-allowable time information;
    notifying the terminal device of an action instruction based on the determined action; and
    notifying the terminal device of a map in which a danger level for each place is defined, wherein the terminal device executes the action in an emergency situation based on the action instruction and the map.

19. A non-transitory computer-readable medium having stored thereon computer-executable instructions which, when executed by a processor, cause the processor to execute operations, the operations comprising:
    receiving a report request from a base station;
    transmitting, based on the received report request, action-allowable time information regarding an action-allowable time to the base station;
    receiving an action instruction from the base station based on the transmitted action-allowable time information;
    receiving, from the base station, a map in which a danger level for each place is defined; and
    controlling an action of a moving object in an emergency situation, based on the action instruction and the map in which the danger level for each place is defined.

20. A non-transitory computer-readable medium having stored thereon computer-executable instructions which, when executed by a processor, cause the processor to execute operations, the operations comprising:
    transmitting a report request to a terminal device;
    acquiring, based on the transmitted report request, action-allowable time information regarding an action-allowable time of the terminal device;
    determining an action of the terminal device based on the action-allowable time information;
    notifying the terminal device of an action instruction based on the determined action; and
    notifying the terminal device of a map in which a danger level for each place is defined, wherein the terminal device executes the action in an emergency situation based on the action instruction and the map.

* * * * *